United States Patent
Shamee et al.

(10) Patent No.: US 10,333,698 B2
(45) Date of Patent: Jun. 25, 2019

(54) ENTWINED ENCRYPTION AND ERROR CORRECTION

(71) Applicant: Raytheon Company, Waltham, MA (US)

(72) Inventors: Bishara Shamee, Playa Del Rey, CA (US); Steven R. Wilkinson, Stevenson Ranch, CA (US); Anna M. Johnston, Vancouver, WA (US)

(73) Assignee: Raytheon Company, Waltham, MA (US)

( * ) Notice: Subject to any disclaimer, the term of this patent is extended or adjusted under 35 U.S.C. 154(b) by 115 days.

(21) Appl. No.: 15/667,111

(22) Filed: Aug. 2, 2017

(65) Prior Publication Data

US 2019/0020470 A1    Jan. 17, 2019

Related U.S. Application Data

(60) Provisional application No. 62/532,563, filed on Jul. 14, 2017.

(51) Int. Cl.
*H04L 9/28* (2006.01)
*H04L 29/06* (2006.01)
(Continued)

(52) U.S. Cl.
CPC ........ *H04L 9/0625* (2013.01); *H03M 13/151* (2013.01); *H03M 13/6508* (2013.01);
(Continued)

(58) Field of Classification Search
CPC ............ H03M 13/151; H03M 13/6508; H04L 2209/34; H04L 2209/46; H04L 9/008;
(Continued)

(56) References Cited

U.S. PATENT DOCUMENTS 9,503,263 B2    11/2016 Johnston
10,116,437 B1 *  10/2018 Krendelev ............. H04L 9/008
(Continued)

FOREIGN PATENT DOCUMENTS

TW    201909594 A    3/2019

OTHER PUBLICATIONS

Yu, Jiun-Hung, and Hans-Andrea Loeliger. "Decoding of interleaved Reed-Solomon codes via simultaneous partial inverses." Information Theory (ISIT), 2015 IEEE International Symposium on. IEEE, 2015. (Year: 2015).*

(Continued)

*Primary Examiner* — Michael Simitoski
(74) *Attorney, Agent, or Firm* — Schwegman Lundberg & Woessner, P.A.

(57) ABSTRACT

Generally discussed herein are systems, devices, and methods for entwined encryption and error correction and/or error detection. An entwined cryptographic encode device can include a memory including data indicating a set of relatively prime, irreducible polynomials stored and indexed thereon, entwined encryption encoding circuitry to receive data, transform the data to a set of data integers modulo respective polynomial integers representative of respective polynomials of the polynomials stored on the memory, and perform a Da Yen weave on the transformed data based on received cipher data, and provide the weaved transformed data to a medium.

20 Claims, 6 Drawing Sheets

(51) Int. Cl.
*H03M 13/00* (2006.01)
*H04L 9/06* (2006.01)
*H03M 13/15* (2006.01)
*H04L 9/08* (2006.01)
*H04L 9/30* (2006.01)
*H04L 9/00* (2006.01)

(52) U.S. Cl.
CPC .............. *H04L 9/008* (2013.01); *H04L 9/065* (2013.01); *H04L 9/0861* (2013.01); *H04L 9/0869* (2013.01); *H04L 9/3026* (2013.01); *H04L 9/3033* (2013.01); *H04L 9/3093* (2013.01); *H04L 2209/34* (2013.01); *H04L 2209/46* (2013.01)

(58) Field of Classification Search
CPC ..... H04L 9/0625; H04L 9/065; H04L 9/0861; H04L 9/3026; H04L 9/3033; H04L 9/3093
See application file for complete search history.

(56) References Cited

U.S. PATENT DOCUMENTS

| | | | | |
|---|---|---|---|---|
| 2005/0086484 | A1* | 4/2005 | Muratani | G06T 1/005 713/176 |
| 2012/0288086 | A1* | 11/2012 | Schaffer | G06F 7/724 380/28 |
| 2013/0339722 | A1* | 12/2013 | Krendelev | H04L 9/008 713/150 |
| 2014/0177828 | A1* | 6/2014 | Loftus | H04L 9/008 380/44 |
| 2015/0095747 | A1* | 4/2015 | Tamo | H03M 13/151 714/781 |
| 2015/0270967 | A1* | 9/2015 | Susella | H04L 9/3093 380/30 |
| 2015/0312028 | A1* | 10/2015 | Cheon | H04L 9/008 713/189 |
| 2016/0112197 | A1 | 4/2016 | Johnston | |
| 2017/0293913 | A1* | 10/2017 | Gulak | G06Q 20/3829 |
| 2018/0309574 | A1* | 10/2018 | Lyubashevsky | H04L 9/3093 |

OTHER PUBLICATIONS

"International Application Serial No. PCT US2018 041623, International Search Report dated Oct. 8, 2018", 4 pgs.

"International Application Serial No. PCT US2018 041623, Written Opinion dated Oct. 8, 2018", 6 pgs.

Anna, Johnston, "Dispersed Cryptography and the Quotient Ring Transform", International Association for aryptologic Research, vol. 20170220:143702, XP061022816, [retrieved on Feb. 14, 2017], (Feb. 14, 2017), 1-27.

Yang, Ling, et al., "A Secure and Fast Dispersal Storage Scheme Based on the Learning with Errors Problem", 12th EAI International Conference on Security and Privacy in Communication Networks (SecureComm'16), (2016), 20 pgs.

"Taiwanese Application Serial No. 107121339, First Office Action dated Mar. 4, 2019", with English translation of claims, 10 pgs.

"Taiwanese Application Serial No. 107121339, Response filed Apr. 22, 2019 to First Office Action dated Mar. 4, 2019", with English machine translation, 148 pgs.

* cited by examiner

US 10,333,698 B2

ENTWINED ENCRYPTION AND ERROR CORRECTION

CROSS-REFERENCE TO RELATED APPLICATION

This patent application claims the benefit of U.S. Provisional Patent Application No. 62/532,563, filed Jul. 14, 2017, entitled "ENTWINED ENCRYPTION AND ERROR CORRECTION", which is incorporated by reference herein in its entirety.

TECHNICAL FIELD

Embodiments discussed herein regard devices, systems, and methods for encrypting and encoding data. One or more embodiments can include error correction and/or data verification abilities.

BACKGROUND

Encrypting data obfuscates data to an entity that intercepts the data. The intended information is generally referred to as plaintext. The encrypted information is ciphertext. An authorized receiver of the ciphertext can generally decrypt the ciphertext to recover the plaintext.

Error detection is an ability to determine whether the plaintext recovered at the receiver is the intended plaintext. Error correction is the ability to determine the intended plaintext if an error is present in the recovered plaintext.

Previous encryption techniques do not provide an inherent and flexible ability to detect and/or correct errors in recovered plaintext.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1:
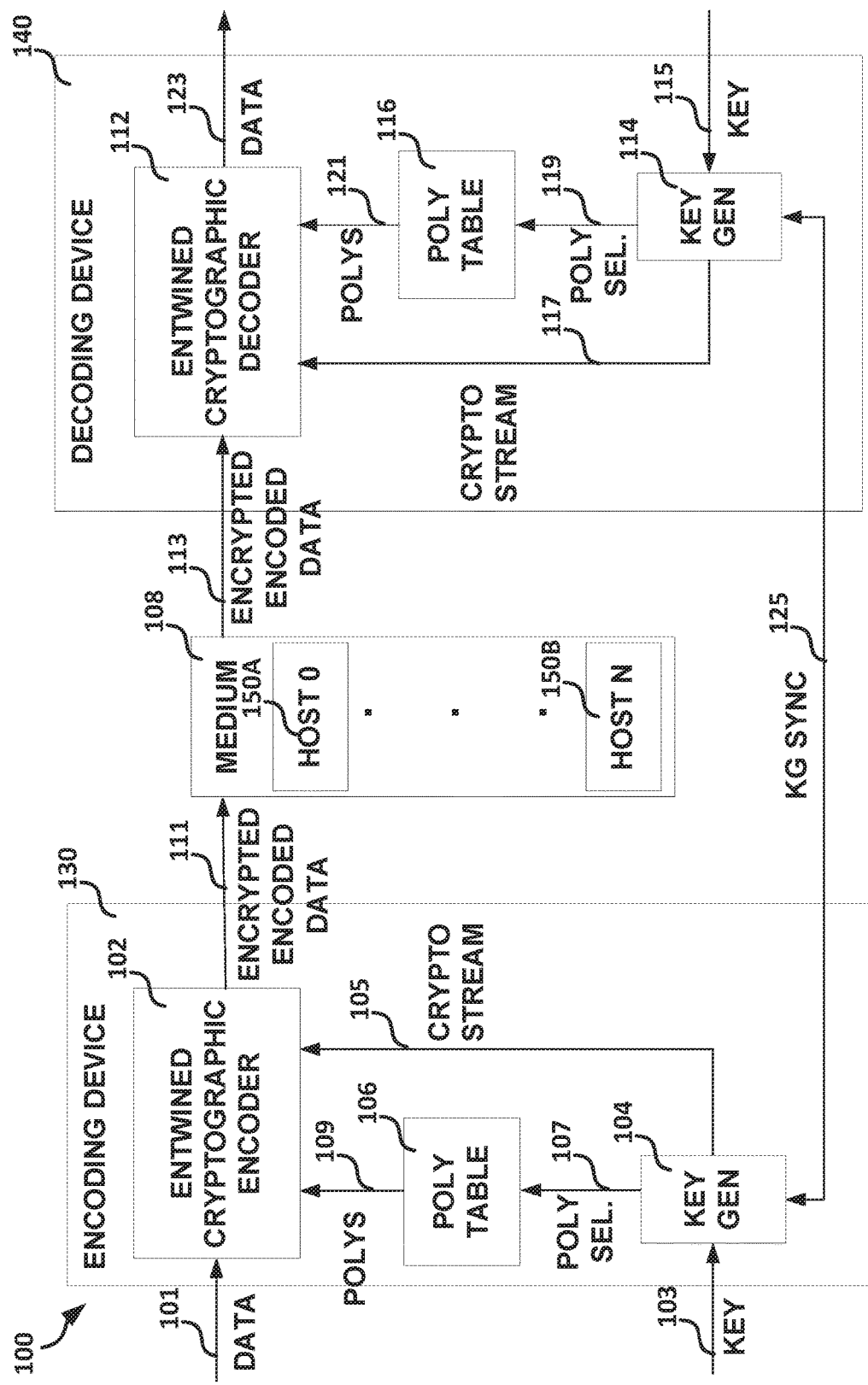
FIG. 1 illustrates, by way of example, a schematic diagram of an embodiment of a system.

Embodiments in this disclosure generally relate to encoding schemes that provide error correction and/or error detection and encryption capabilities, sometimes referred to as entwined encryption. The encodings discussed herein encrypt data and allow portions of the encrypted data to be lost or altered between a sender and a receiver, such as in a medium, while still being able to recreate the original data at the receiver.

Some cryptographic systems convert data from plaintext to equally sized ciphertext (equal in number of bits occupied by the plaintext and ciphertext). These systems may offer no integrity for lost or corrupted data, generally have no secondary protection in case of compromised cryptovariable (key), and are not generally homomorphic. That is, operations on plaintext are not possible in their encrypted form. Entwined Cryptographic Encoding (ECE), a cryptographic technique discussed herein takes a different path, with more flexibility, homomorphic properties, and the ability to add data integrity (e.g., error detection and/or error correction abilities).

ECE converts a block of data into many independent words of cipher. On their own these pieces are secure; even if the piece of data and the cryptographic key were compromised, no information about the plaintext data would be revealed. Further, the system has error detection and/or error correction capabilities; errors can be detected and/or corrected. In ECE individual ciphertext pieces may be lost without any loss to the original data.

This is possible by Da Yen, sometimes referred to as the Chinese Remainder Theorem, and implemented using a stream cipher (e.g., a cipher from the eSTREAM collection, from the European Network of Excellence in Cryptology (ECRYPT), Advanced Encryption Standard (AES) in counter mode, from the United States Institute of Standards and Technology (NIST), or other stream cipher) and a data transformation technique referred to as a weave. Theoretical proofs and examples are provided in an Appendix to not disrupt the flow. To prevent this disruption, proofs and examples are in the Appendix, with references to them at the appropriate places.

ECE is flexible, allowing for different word sizes, plaintext and ciphertext block sizes, and varying error correction capabilities. The system can be designed with no, minimal, and large error correction capabilities. An amount of overhead required per error is about equivalent to the overhead in Reed-Solomon encoding. ECE was designed so that not all ciphertext is needed for decryption. If a minimum number of ciphertext words are recovered, plaintext can be recovered.

The following variables are used to tailor the system to a users' needs: a set, M, of irreducible polynomials of degree v, 2r plaintext words in a block of data, a maximal number of errors that may be corrected, s, and n cipher words, where n=2(r+s).

2r text words and 2s key words represent a reduction of a degree $v(n-1)$ polynomial over $F_2$, modulo $2(r+s)$ relatively prime polynomials in M of degree v. The key stream determines the moduli as well as the 2s key words. Encryption and encoding are accomplished by swapping one set of moduli for another, leaving the underlying $v(n-1)$ degree polynomial unchanged.

Using the Da Yen weave transform (discussed elsewhere), words of data can be efficiently mixed with key and moduli into cipher words. Only operations in $F_{2^v}$ are necessary. Decoding/decryption can use the same transformation as encoding but with different moduli. Using theoretical tools similar to those used in Reed-Solomon coding, the overdetermined nature of the system allows errors to be detected and corrected.

Using entwined encryption, even if a cryptography key is broken, the data remains secure unless enough data blocks (of the original data) are recovered. Entwined encryption may improve diffusion of data in a cryptosystem. If any bit of input data is modified, every bit of the resulting output has about a fifty percent chance of flipping (e.g., from a logical "1'" to a logical "0" or vice versa). Other encryption techniques have no such diffusion. By entwining error correction and encryption in a manner discussed herein, the security of the cryptosystem may be improved.

FIG. 1 illustrates, by way of example, a schematic diagram of an embodiment of a system 100. The system 100 can be used for implementing encoding and decoding using an ECE technique. All the items upstream from encrypted encoded data 111 are part of ECE encryption. All the items downstream from encrypted encoded data 113 are part of ECE decryption. Key syncing can help the performance (in terms of an ability to decipher correct plaintext from ciphertext) of the system 100.

Data 101 is received at an entwined cryptographic encoder 102. The data 101 is sometimes referred to as plaintext. Other inputs to the entwined cryptographic encoder 102 include a crypto stream 105 and polynomials 109.

A key 103 is received at a key generator 104. The key 103 is a seed variable or other initializing data that causes the key generator 104 to produce a stream of ciphertext. The stream of ciphertext may be used to select polynomials from a polynomial table 106 (as indicated by polynomial selection 107) and as extra cipher words provided to the entwined cryptographic encoder 102 (as indicated by crypto stream 105). The key generator 104 produces a cipher stream, such as using a cipher technique from eSTREAM or AES previously discussed, or another cipher stream.

The polynomial table 106 includes v-degree relatively prime polynomials in $F_2$. The polynomials in the polynomial table 106 can be indexed by root, with a primitive having index zero, and the remaining polynomials ordered by ascending root. The root and primitive notion is discussed further elsewhere herein. The polynomial selector 107 provides the indexes of polynomials that are provided to the entwined cryptographic encoder 102 as polynomials 109.

The entwined cryptographic encoder 102 transforms the data 101 based on the polynomials 109 and the crypto stream 105. The result of the transform is encrypted encoded data 111. At least some of the operations performed by the entwined cryptographic encoder are discussed with regard to FIG. 3 and elsewhere herein. A summary of the operations performed by the entwined cryptographic encoder 102 includes: receiving the data 101, the crypto stream 105, and the polynomials 109; creating data relations based on the data 101 and the polynomials 109; creating key relations based on the crypto stream 105 and the polynomials 109; initializing return relations based on the data 101, the crypto stream 105, and/or the polynomials 109; transforming data relations; weave extracting cipher words; and/or performing a weave transform to create the encrypted encoded data 111.

The encrypted encoded data 111 is provided to a receiver, such as through a medium 108. The medium 108 can include a wired or wireless medium. A wired medium includes a non-air medium (e.g., an optical fiber or conductive medium). A wireless medium includes a signal provided through an air medium. The signal provided to the medium (the encrypted encoded data 111) may be different than the signal provided to the entwined encrypted decoder 112, as indicated by the encrypted encoded data 113. The medium 108 can interact with and alter the encrypted encoded data 111, such as to drop a portion of the encrypted encoded data 111 and/or alter a value represented by the encrypted encoded data 111. In one or more instances, an entity may intercept the encrypted encoded data 111 as it is being transmitted through the medium 108 and alter the encrypted encoded data 111.

There may be one or more hosts 150A-150B in the medium 108. Each of the hosts 150A-150B can receive at least a portion of the encrypted encoded data 111. Each of the hosts 150A-150B can forward their portion of the encrypted encoded data 111 as the encrypted encoded data 113. The portions of the encrypted encoded data 111 can comprise disjoint subsets of the data 101, such as to include the entirety of the data 101 in encrypted encoded form. In such an embodiment, an entity would need to intercept all of the data from all of the hosts 150A-150B to recreate the data 101, assuming the keys and other encryption steps could be determined.

An entwined crypto decoder 112 can receive the encrypted encoded data 113, polynomials 121, and crypto stream 117. The crypto stream 117 and polynomial selection 119 can be provided by a key generator 114. The key generator 114 is another instantiation of the key generator 104, such that if a key 115 is the same as the key 103, the output of the key generator 104 is the same as the output of the key generator 114. The polynomial table 116, similarly, is another instantiation of the polynomial table 106, such as to include polynomials indexed in the same manner.

The entwined cryptographic decoder 112 transforms the encrypted encoded data 113 into data 123 based on the polynomials 121 and the crypto stream 105. The data 123 is the same as the data 101 if there are less than (or equal to) a maximum number of errors in the encrypted encoded data 113. The maximum number of errors is configurable and discussed elsewhere herein. The result of the transform is the data 123. The operations performed by the entwined cryptographic decoder 112 are discussed with regard to FIG. 4 and elsewhere herein. A summary of the operations performed by the entwined cryptographic decoder 112 includes: receiving the encrypted encoded data 113, the crypto stream 117, and the polynomials 121; creating key relations based on the crypto stream 117 and the polynomials 121; initializing return relations based on the encrypted encoded data 113, the crypto stream 117, and/or the polynomials 121; performing a weave transform to create a possible version of the data 123; checking the created data 123 to determine if it is correct; if not correct, swapping words in the transformed encrypted encoded data; checking the swapped data to determine if correct; and if correct, providing the data 123 as plaintext to a receiver.

To perform accurate and consistent decoding, the keys 103 and 115 can be synced, such as to produce consistent keys. The consistent keys can help ensure that the crypto streams 105 and 117 are consistent and/or the polynomial select data 119 and 107 are consistent. That is, for decoding the encrypted encoded data 111 that is encrypted based on the polynomial select data 107 and the crypto stream 105, the key generator 114, in providing a decryption process cipher stream, produces the same polynomial select data 119 as the polynomial select data 107 and crypto stream 117 as the crypto stream 105. Syncing the keys can include providing a key generator sync signal 125, such as may indicate a start time, an acknowledge or the like, to indicate that each of the key generators 104 and 114 will produce the same bits for their respective cipher streams. One or more of the hosts 150A-150B may be similarly synced with the encoding device 130 and/or the decoding device 140.

Figure 2:
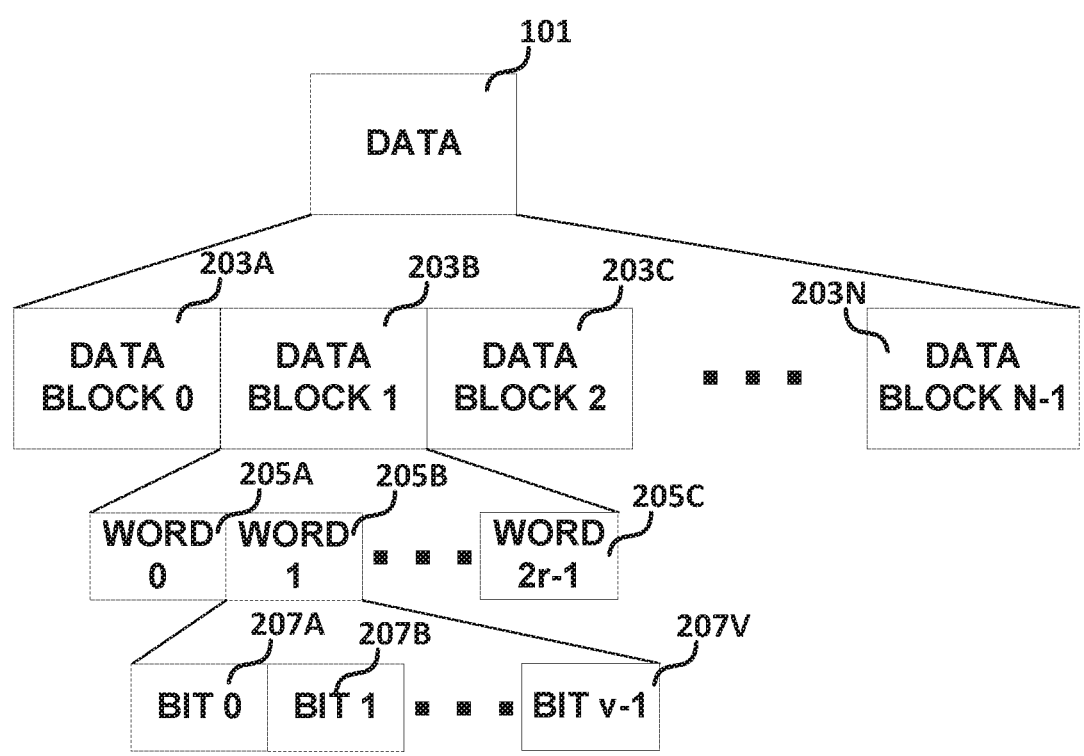
FIG. 2 illustrates, by way of example, a schematic diagram of an embodiment of data being split into words.

FIG. 2 illustrates, by way of example, a schematic diagram of an embodiment of data 101 being split into words. The data 101 is split into data blocks 203A, 203B, 203C . . . 203N. Each of the data blocks 203A-203N can include 2r words. Each of the data blocks 203A-N is split into 2r words 205A, 205B, . . . , and 205C. Each of the words 205A-C includes v bits including the bits 207A, 207B, . . . , 207V. The entwined cryptographic encoder 102 can perform these data splitting operations to portion the data 101 to the proper level for processing.

Figure 3:
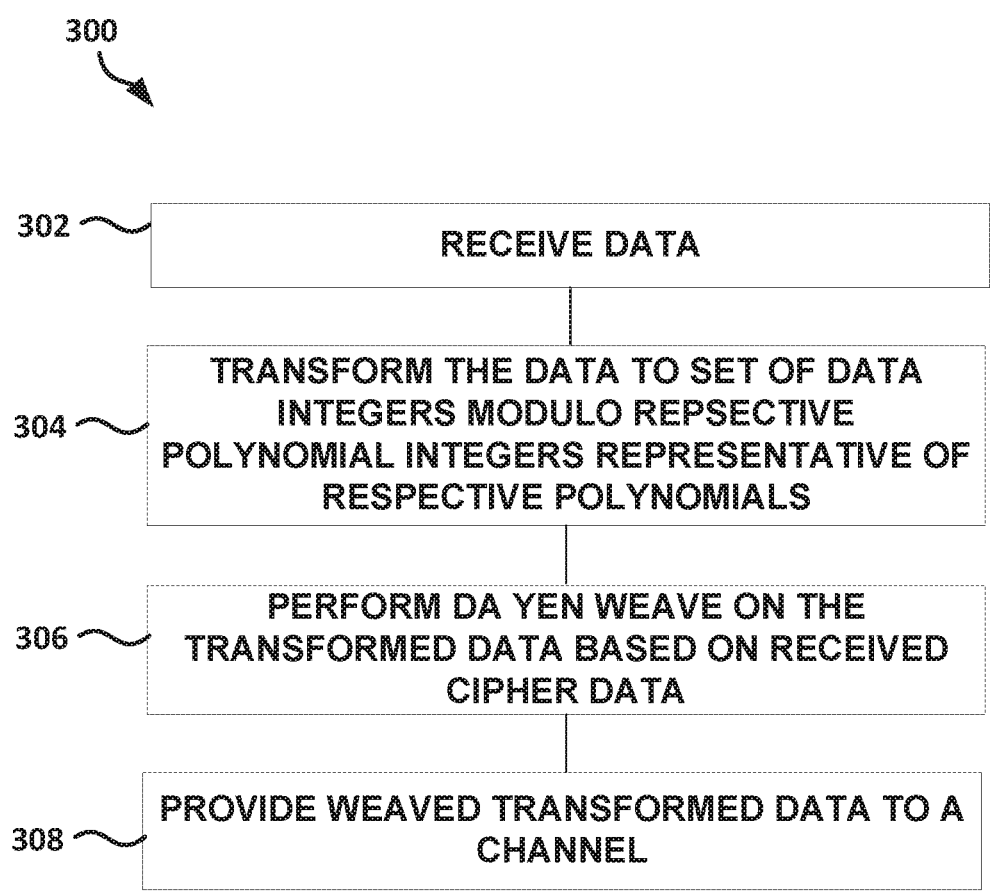
FIG. 3 illustrates, by way of example, a diagram of an embodiment of a method for performing an entwined cryptographic encoding.

FIG. 3 illustrates, by way of example, a diagram of an embodiment of a method 300 for performing an entwined cryptographic encoding. The method 300 can be performed by the entwined cryptographic encoder 102. The method 300, as illustrated, includes receiving data (to be encrypted and/or encoded), at operation 302; transforming the data to a set of data integers modulo respective polynomial integers representative of respective polynomials of the polynomials stored on the memory; at operation 304; performing a Da Yen weave on the transformed data based on received cipher data, at operation 306; and providing the weaved transformed data to a medium, at operation 308.

The method 300 can further include producing, by key generator circuitry, a cipher stream of data based on a key. The method 300 can further include, wherein the entwined encryption encoding circuitry is further configured to transform the data to a set of data integers modulo respective polynomial integers and perform the Da Yen weave based on the received cipher stream. The method 300 can further include, wherein another portion of the cipher stream provides an index to the respective polynomials.

The method 300 can further include, wherein the polynomials are indexed based on a respective root and primitive of the polynomials. The method can further include, wherein the weaved transformed data includes the transformed received data and transformed cipher data transformed, by the entwined cryptographic encoder circuitry, based on data from the cipher stream. The method 300 can further include splitting the received data into blocks of v-bit words. The operation 304 can further include transformation of the blocks of v-bits words individually. The method 300 can further include, wherein v is a maximum degree of the polynomials in the memory. The method 300 can further include, wherein a number of t-bit cipher words provided by the cipher stream includes the number of words in a block of the blocks, 2r, plus two times a maximum number of errors to be corrected, s, and a number of v-bit cipher words provided by the cipher stream includes two times the maximum number of errors to be correctd, wherein the weaved transformed data includes transformed versions of each of the v-bit words of the data block and transformed versions of the 2s, v-bit words from the cipher stream, wherein the number of polynomials in the memory is $2^t$.

Figure 4:
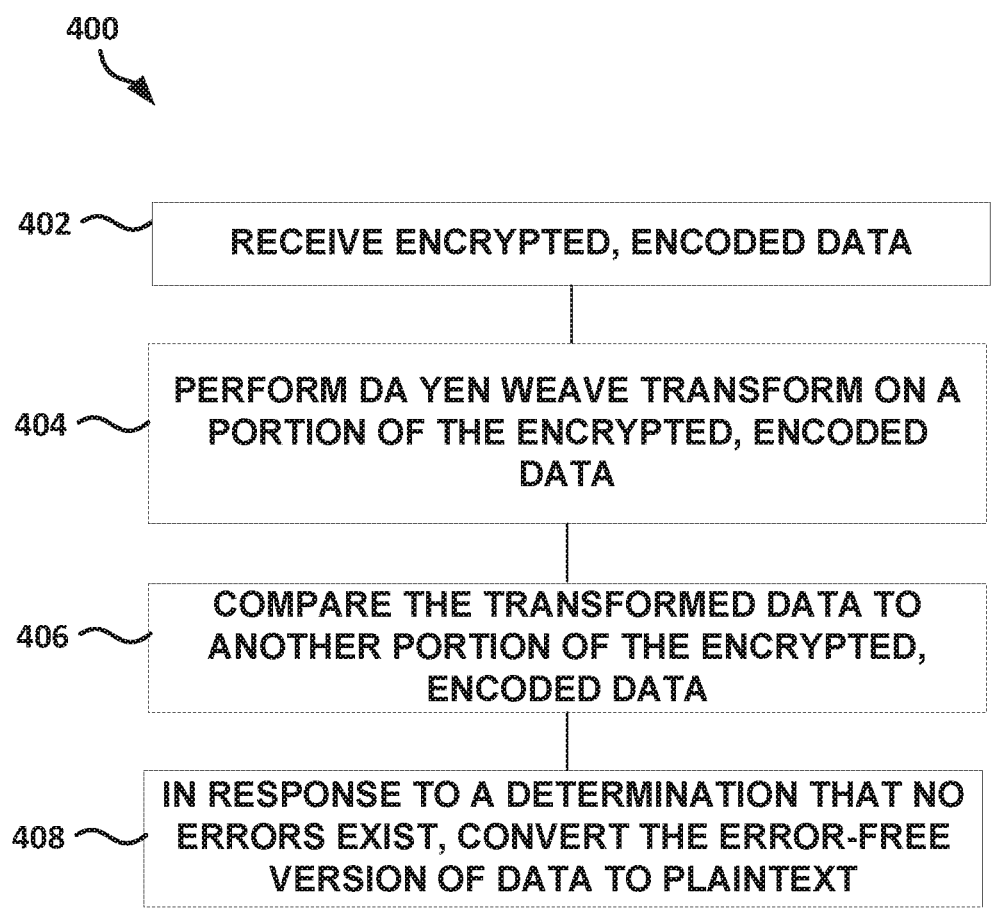
FIG. 4 illustrates, by way of example, a diagram of an embodiment of a method for performing an entwined cryptographic decoding.

FIG. 4 illustrates, by way of example, a diagram of an embodiment of a method 400 for performing an entwined cryptographic decoding. The method 400 can be performed by the entwined cryptographic decoder 112. The method 400, as illustrated, includes receiving encrypted, encoded data, at operation 402; performing a Da Yen weave transform on a portion the encrypted, encoded data, at operation 404; comparing the transformed data to another portion of the encrypted, encoded data (to determine if errors exist in the transformed data), at operation 406; and in response to a determination that no errors exist, convert the error-free version of data to plaintext, at operation 408. The method 400 can further include providing the plaintext to a receiver.

The method 400 can further include in response to a determination that errors exist, perform a weave swap on two words of the transformed data. The method 400 can further include comparing the weave swapped data to a different portion of the encrypted, encoded data to determine if errors exist in the weave swapped version. The method 400 can further include producing, by key generator circuitry, a cipher stream of data based on a key. The operation 404 can include transforming the encrypted encoded data to a set of data integers modulo respective polynomial integers and perform the Da Yen weave transform based on the received cipher stream.

The method 400 can further include, wherein another portion of the cipher stream provides an index to respective polynomials represented by respective polynomial integers. The method 400 can further include, wherein the polynomials are indexed based on a respective root and primitive of the polynomials. The method 400 can further include, wherein the weave transformed data includes the transformed received data and transformed cipher data transformed, by the entwined cryptographic decoding circuitry, based on data from the cipher stream. The method 400 can further include, wherein, wherein v is a maximum degree of the polynomials in the memory, wherein a number of t-bit cipher words provided by the cipher stream includes the number of words in a block of the blocks, 2r, plus two times a maximum number of errors to be correctd, s, and a number of v-bit cipher words provided by the cipher stream includes two times the maximum number of errors to be correctd, wherein the weaved transformed data includes transformed versions of each of the v-bit words of the data block and transformed versions of the 2s, v-bit words from the cipher stream, wherein the number of polynomials in the memory is $2^t$.

A summary of operations that may be performed using the method 400 is now provided in more mathematical terms.

The methods 300 and 400 include encoding and decoding, respectively, and may be used together. One or more of the methods 300 and 400 may include the following operations:

A) receive input word size, v, in bits wherein v is a power of two, such as {8, 16, 32, 64, . . . } (at entwined cryptographic encoder 102 and/or key generator 104).

B) receive 2r plain words to be encrypted (at entwined cryptographic encoder 101).

C) generate 2sv bits (e.g., by key generator 104).

D) split 2sv bits into 2s v-bit keys (e.g., at entwined cryptographic encoder 102). Each v-bit key is $\overline{k}_j$.

E) generate 2vn bits (e.g., by key generator 104).

F) split 2vn bits into 2n v-bit pointers (e.g., at entwined cryptographic encoder 102). Each v-bit pointer is $k_j$ and points to a polynomial in the polynomial table. No two $k_j$ are equal. A maximum value of $k_j$ includes a value less than (or equal to) $2^v-1$.

G) generate 2n polynomials (e.g., irreducible polynomials) of degree $2^v-1$, where q=2n>v (at polynomial table 106), based on $k_j$. Each polynomial is indicated by $M_{kj}$.

H) create data relations $\delta_j$=dj mod ($M_{kj}$) (e.g., by the entwined cryptographic encoder 102).

I) produce n, $C_i$, cipher words by performing Da Yen weave transform (e.g., by the entwined cryptographic encoder 102).

J) transmit cipher words (e.g., by the entwined cryptographic encoder 102 over the medium 108).

K) receive cipher words $C_i$ (e.g., by the entwined cryptographic decoder 112).

L) receive input word size, v, in bits wherein v is a power of two, such as {8, 16, 32, 64, . . . } (at entwined cryptographic decoder 112 and/or key generator 104).

M) generate 2sv bits (e.g., by key generator 114).

N) split 2sv bits into 2s v-bit keys (e.g., at entwined cryptographic encoder 112). Each v-bit key is $\overline{k}_j$.

O) generate 2vn bits (e.g., by key generator 114).

P) split 2vn bits into 2n v-bit pointers (e.g., at entwined cryptographic encoder 112). Each v-bit pointer is $k_j$ and points to a polynomial in the polynomial table. No two $k_j$ are equal. A maximum value of $k_j$ includes a value less than (or equal to) $2^v-1$.

Q) generate 2n polynomials (e.g., irreducible polynomials) of degree $2^v-1$, where q=2n>v (at polynomial table 116), based on $k_j$. Each polynomial is indicated by $M_{kj}$.

R) create key relations: $v_j=(\overline{k}_j \bmod m_{k_{2r+1}})$.

S) create the cipher relations: $v_{2s+j}=(c_j \bmod m_{k_j})$.

T) Initialize return relations: $\delta j=(0 \bmod m_{k_j})$ for $0 \le j < 2r$.

U) Perform Da Yen weave transform to extract plain words $\{d_0, d_1, \ldots, d_{2r}\}$.

The next section details more specifics regarding operations of the system 100. The next section begins with some definitions and basics, on which proofs and further discussion of ECE relies.

ECE uses a Da Yen weave transform, and for that a few definitions and some theory may be helpful. A theorem used for the weave is the Da Yen. The Da Yen maps a set of relations to a single relation and back again.

Let E be a Euclidean domain. A relation $\mu$, is a pair of elements $\dot{\mu}, \hat{\mu} \in \varepsilon$, $\hat{\mu} \ne 0$ and a non-unit, $|\dot{\mu}| < |\hat{\mu}|$ with $\mu$ representing $\dot{\mu} \bmod \hat{\mu}$ In general, a relation (d mod m) refers to a coset, or set of elements of the Euclidean domain. Because ECE considers real data and integers, unless stated otherwise, the relations here will always be in reduced form (e.g., $|d|<|m|$).

The size (Euclidean norm) restriction $|\dot{\mu}|<|\hat{\mu}|$ may provide stability uniqueness of data as it moves between different rings (moduli).

Equally sized, relatively prime moduli do not exist over the integers, but can be found if the Euclidean domain is a polynomial ring over a finite field. In ECE the Euclidean domain will be F2[x]. The pair of elements $(\dot{\mu}, \hat{\mu})$ in a relation $\mu$ with polynomials over F2 with $|\dot{\mu}|=|\hat{\mu}|=\deg(\hat{\mu})$.

Relations are a component of ECE, therefore a simplified way to compare and combine relations and data may be convenient. Let $\mu_j$, $\mu_k$ be two relations with $x \in \varepsilon$. $\mu_j$, $\mu_k$ are relatively prime if their respective moduli $\hat{\mu}_j$, $\hat{\mu}_k$ are relatively prime. $\mu_j$, $\mu_k$ are equivalent if respective moduli are the same size ($|\hat{\mu}_j|=|\hat{\mu}_k|$) and $\dot{\mu}_j=\dot{\mu}_k$. $x=\mu$ implies $x=\dot{\mu} \bmod \hat{\mu}$. $x+\mu=\mu+x$ represents the relation ($x+\dot{\mu} \bmod \hat{\mu}$).

The Da Yen (Chinese Remainder Theorem) is an isomorphism between the direct product of factor rings and a single factor ring. The Da Yen provides a foundation of the Da Yen weave transform equating a set of relations R to a single relation $\langle R \rangle$. Shorthand for the modulus and value of $\langle R \rangle$ is $\langle \hat{R} \rangle = \hat{R}$ and $\langle \dot{R} \rangle = \dot{R}$. The general ring version of the Da Yen and its proof can be found elsewhere. The following is a presentation of Da Yen using relations. Let R be a set of relatively prime relations. Then there exists a mapping (and its inverse) from R to a relation $\langle R \rangle$ such that:

1: $\hat{R}=\Sigma_{\mu \in R}\hat{\mu}$
2: $\dot{R}=\mu$ for all $\mu \in R$.
3. (homomorphic) For any two relation sets $R=\{\mu_j|0 \le j<n\}$, $Q=\{v_k|0 \le k<n\}$ with equal size and moduli (e.g., $\hat{\mu}_j=\hat{v}_j$ for $0 \le j<n$), $\langle R \rangle + \langle Q \rangle = \langle \{\mu_j+v_j \bmod \hat{\mu}_j|0 \le j<n\} \rangle$ $\langle R \rangle \langle Q \rangle = \langle \{\mu_j v_j \bmod \hat{\mu}_j|0 \le j<n\} \rangle$ The Da Yen weave transform, in part, may convert a set of relations R to the relation $\langle R \rangle$, one relation at a time. Operations of the weave transform may create the relation $\langle R_t \rangle$ where $R_t=\{\mu_j|0 \le j<t\}$, with $\dot{R}_t$ in reduced form. Let $R=\{\mu_j|0 \le j<n\}$ be a set of relatively prime relations, the subsets $R_t=\{\mu_j|0 \le j<t\}$ and $\langle R_1 \rangle = \mu_0$ and $\hat{R}_t=\Pi_{j=0}^{t-1}\hat{\mu}_j$, for $1<t \le n$. Then $$\omega_{t-1}=(\langle \hat{R}_{t-1} \rangle^{-1}(\mu_{t-1}-\langle R_{t-1} \rangle) \bmod \hat{\mu}_{t-1}) \qquad (1)$$

$$\langle \dot{R}_t \rangle = \langle R_{t-1} \rangle + \langle \hat{R}_{t-1} \rangle \dot{\omega}_{t-1} \qquad (2)$$

for $1<t \le n$.

The Da Yen weave transform may compute the inner relations $w_{t-1}$, such as without computing the large relation $\langle R_{t-1} \rangle$. After the $w_{t-1}$ have been computed, the full relation can be computed with the result already in reduced form ($|\dot{R}|<|\hat{R}|$):

$$\dot{R}=\dot{w}_0+\hat{w}_0(\dot{w}_1+\hat{w}_1)\ldots(\dot{w}_{n-2}+\overline{w}_{n-2}\dot{w}_{n-1}\ldots)) \qquad (3)$$

Because this result is already in reduced form and the w relations can be computed within their own factor rings, the relation may be computed and reduced modulo $\hat{\mu}$, such as by using small moduli and relation $\mu$ operations.

Let $R=\{\mu_j|0 \le j<n\}$ be a set of relatively prime relations with combined relation $\langle R \rangle$. For any relation $\alpha$, define the relation $R(\alpha)=(\dot{R} \bmod \hat{\alpha})$:

$$R(\alpha)=\dot{w}_0+\hat{w}_0(\dot{w}_1+\hat{w}_1(\ldots(\dot{w}_{n-2}+\hat{w}_{n-2}\dot{w}_{n-1}))) \bmod \hat{\alpha} \qquad (4)$$

The weave encoding can use this relation evaluation process to convert a set of distinct relations I to a set J. Let I, J be sets of relatively prime relations with $|\hat{I}|=|\hat{J}|$. I encoded into J is the set of relations $I(J)=\{I(\alpha)|\alpha \in J\}$. Two sets of relations, I, J are called equivalent if:

1. $|I|=|J|$
2. $\langle I \rangle = \langle J \rangle$

Notice that encoded set I(J) is equivalent by definition to I. Equivalent sets enable decoding and the independence of encoded blocks. As long as an error free set of 2r encoded relations is recovered, the original plain text can be recovered. Any added relations can be used for error checking and correction.

The weave transform converts an ordered set of relatively prime relations $R=\{\mu_j|0 \le j<n\}$, to equivalent weave terms. A computational cost in serial is $$\binom{n}{2}=\frac{n(n-1)}{2}$$

"divide" operations over $F_{2^v}$. Parallelization can reduce the time to (n−1) operations.

Order does not matter in the set of relations R, but order does matter in the transformed set of $w_j$ values. The $w_j$ value computed during the iterative Da Yen depends on the relations in the subset $R_j=\{\mu_i|0 \le i<j\}$, to obtain $\langle R_j \rangle$, and $\mu_j$ itself, but not on any $\mu_i$ with $i>j$. Order can be important during the decoding process. For at least this reason, the ordering of the relations in R will be specified for each transform.

Da Yen Weave Transform and Permutations

Let $\pi$ be a permutation on the integers $0 \le j<n$, defaulting to the identity: $\pi(i)=j$ for $0 \le j<n$. Then for any $0<t \le n$, $$\langle R_t^\pi \rangle = \langle \{\mu_{\pi(j)}|0 \le j<t\} \rangle \qquad (5)$$

$$\dot{R}_t^\pi=\dot{w}_{\pi(0)}+\hat{w}_{\pi(0)}(\dot{w}_{\pi(1)}+\hat{w}_{\pi(1)}(\ldots(w_{\pi(t-2)}+\hat{w}_{\pi(t-2)}w_{\pi(t-1)})\ldots)) \qquad (6)$$

$$R_t^\pi(\alpha)=\dot{R}_t^\pi \bmod \hat{\alpha} \qquad (7)$$

and $R_t^\pi(\mu_{\pi(j)})=\mu_{\pi(j)}$ for all $0 \le j<t$.

Da Yen Weave Transform Technique

Input: $R=\{\mu_j|0 \le j<n\}$, an ordered set of relatively prime relations and x a permutation on $\{0, 1, \ldots, n-1\}$ Output: $W=\{w_j|0 \le j<n\}$ an ordered set of relatively prime relations satisfying equation (6).

I: Initialize:
 A: $w_{\pi(0)} = \hat{\mu}_{\pi(0)}$
 B: for k=1 to(n-1): $w_k^{(0)} = \hat{\mu}_{\pi(k)}$;
II: For j=1 to j=(n-1):
 A: $w_{x(j)} = w_j^{(j)}$
 B: For k=(j+1) to k=(n-1):
  $w_k^{(j)} = (\hat{w}_{\pi(j)})^{-1}(w_k^{(j-1)} - \hat{w}_{\pi(j)}) \bmod \hat{w}_k)$
End of Weave Transform Technique ECE detects and corrects errors by assuming a collection of 2r received relations are correct, computing the unused 2s relations and comparing them to the received values. If at least half of these relations are correct and at most s errors exist, then plain text can be extracted from the set.

Let $R = \{\mu_{2s+k} | 0 \le k < n\}$ be the set of n received values and their key-determined moduli, $K = \{\mu_j | 0 \le j < 2s\}$ the set of 2s key relations. Decoding begins by transforming $K \cup R = \{\mu_j, \mu_{2s+k} | 0 \le j < 2s; 0 \le k < n\}$ to $R^\pi$. If less than half the 2s computed values match the unused received values, then errors exist in the current collection of 2r values. Other sets may be tested until one is found that passes the test.

The Da Yen weave transform of different sets of 2r elements can be computed using the weave transform, the swapping pairs of elements in and out, until either a set passes the checks or there are no more sets to check. If no good set is found, then too many errors exist to recover the plaintext.

Weave swapping may help efficiency, requiring only a few operations in the base field instead of a re-computation of the entire transform. Pairing relations can reduce a maximal number of sets to check from $$\binom{2(r+s)}{2r}$$

to $$\binom{r+s}{r},$$

reducing expected computational work to approximately a square root of the time required swapping individuals.

Weave swapping is now explained. Order in the weave transform may help extract values. Let $R = \{\mu_j | 0 \le j < n\}$ and $R^\pi = \{w_{\pi(j)} | 0 \le j < n\}$ be its transform with permutation $\pi$. Recall that $w_{\pi(j)}$ value computed during the iterative Da Yen depends on the relations of the unordered subset $\{\mu_{\pi(i)} | 0 \le i < j\}$ and $\mu_{\pi(j)}$ itself, but not on any $\mu_{\pi(i)}$ with i>j, and low order weave terms can be combined to compute an extracted weave value. Weave swapping allows swapping of the order of two adjacent relations in a woven transform without recomputing the entire transform. Adjacent weave terms may be swapped with one multiply and one "divide" (e.g., compute an inverse and then multiply), and the permutation keeps track of swaps performed. Swapping weave terms j and (j+1) converts $R^\pi$ to $R^\sigma$ where $\sigma(k) = \pi(k) 0 \le k < j; (j+1) < k < n$ $\sigma(j) = \pi(+1)$ $\sigma(j+1) = \pi(j).$ The moduli, $\hat{w}_j = \hat{\mu}_j$ are constant and not effected by swapping relations. Recall that the Da Yen weave transform has intermediate results $w_{\pi(j)}^{(k)} = \hat{w}_{\pi(k)}^{-1}(\dot{w}_{\pi(j)} - \dot{w}_{\pi(k)}) \bmod \hat{\mu}_{\pi(j)}$ with $w_{\pi(j)} = w_{\pi(j)}^{(j)}$. The swapped values in terms of these intermediate values is:

1. $\dot{w}_{\sigma(j)} = \dot{w}_{\pi(j+1)}^{(j)}$ therefore $$\dot{w}_{\sigma(j)} = w_{\pi(j+1)} \hat{w}_{\pi(j)} + \dot{w}_{\pi(j)} \bmod \hat{w}_{\sigma(j)} \quad (9)$$

2. $\dot{w}_{\sigma(j+1)}(j) = \dot{w}_{\pi(j)}$, and for one term higher:

$$\dot{w}_{\sigma(j+1)} = (\dot{w}_{\pi(j)} - \dot{w}_{\sigma(j)}) \hat{w}_{\sigma(j)}^{-1} \bmod \hat{w}_{\sigma(j+1)} \quad (10)$$

These equations simplify for the relation sets used in ECE. All moduli have the same degree over $F_2$ with $\hat{\mu}_j = \hat{\mu}_k \oplus \hat{\mu}_j \bmod \hat{\mu}_k$.

$$\dot{w}_{\sigma(j)} = \dot{w}_{\pi(j+1)} (\hat{\mu}_{\sigma(j)} \oplus \hat{\mu}_{\sigma(j+1)} \oplus \dot{w}_{\pi(j)} \bmod \hat{\mu}_{\sigma(j)} \quad (11)$$

$$\dot{w}_{\sigma(j+1)} = (\dot{w}_{\pi(j)} \oplus \dot{w}_{\sigma(j)}) (\hat{\mu}_{\sigma(j)} \oplus \hat{\mu}_{\sigma(j+1)})^{-1} \bmod \hat{w}_{\sigma(j+1)} \quad (12)$$

Weave Swap Technique
Input: $R^\pi$, $0 \le j < (n-1)$, with $\hat{w}_j = (x \oplus c_j)$
Output: $R^\sigma$ as described elsewhere herein
I: $\dot{w}_{\sigma(j)} = \dot{w}_{\pi(j+1)} (\hat{\mu}_{\sigma(j)} \oplus \hat{\mu}_{\sigma(j+1)}) \oplus \dot{w}_{(j)} \bmod \hat{\mu}_{\sigma(j)}$
II: $\dot{w}_{\sigma(j+1)} = (\dot{w}_{\pi(j)} \oplus \dot{w}_{\pi(j)}) (\mu\sigma_{(j)} \oplus \hat{\mu}_{\sigma(j+1)})^{-1} \bmod \hat{w}_{\sigma(j+1)}$
III: $\sigma = \pi$
IV: $\sigma(j) = \pi(j+1)$
V: $\sigma(j+1) = \pi(j)$
VI: $R^\pi$ is now $R^\sigma$
End Weave Swap Technique Encoding Technique Words of key may be generated using a stream cipher (e.g., a key used for encryption and/or encoding is the stream ciphers output). A set of 2n or q irreducible polynomials of degree v over $F_2$ may be determined. ECE performs a ya den weave encoding using a mix of plaintext and key relations. In embodiments discussed herein, moduli of the relation sets can be determined from the stream cipher. Alternatively, keys and/or moduli may be otherwise randomly chosen.

Encoding Technique
Input:

| | |
|---|---|
| v | the fixed word size (bits per word), generally, v ∈ {8, 16; 32; 64; . . .} |
| M = $\{m_i | 0 \le i < q\}$ | set of irreducible degree v polynomials over $F_2$ |
| 2r | the number of words per plain text block |
| 2s | the added key words |
| n | n = 2(r + s), the number of cipher words |
| $\{d_0, d_1, \ldots, d_{2r-1}\}$ | v-bit plain text words |

Output: $\{c_i | 0 \le i < n\}$, v—bit cipher words
I: Generate key and set up system (assumes key generator is initialized with cryptovariable (e.g., long term key)),
 A: Generate 2v(s+n) bits of key stream from the supplied key generator.
 Label the key bits
 $\{\bar{k}_j | 0 \le j < 2s\}$, where $\bar{k}_j$ is a v-bit word of key;
 $\{k_j | 0 \le j, n\}$, where k is less than q=|M| and $k_i \ne k_j$ for al i≠j.
 B: Create the data relations: $\delta j = (\delta j \bmod m_{k_j})$ for $0 \le j < 2r$.
 C: Create the key relations: $v_j = (\bar{k}_j \bmod m_{2_{r_j}})$ for $0 \le j < 2s$.
 D: Initialize return relations: $\mu_j = (0 \bmod m_{k_{r+j}})$ for $0 \le j < n$.
II: Transform $R = \{\delta j, \delta_{2r+k} = v_k | 0 \le j < 2r, 0 \le k < 2s\}$ into $R^\pi$ with $\pi$ equal to the identity permutation.
III: Weave extract cipher words $c_j = R^\pi(\mu_j)$ for $0 \le j < n$.
End Encoding Technique The decoding process in ECE is like encoding in that a Da Yen weave transform is performed in decoding. If there are no errors and at least 2r correct relations, decoding can be performed. If(2r+t) relations were received with at most t/2 errors, an error free set of 2r relations can be found and error free plaintext extracted.

Check Decoding Weave Technique
Input:

| | |
|---|---|
| $R = \{v_j \mid 0 \le j < (n+t)\}$ | A set of relations |
| $R^\sigma = \{w_j \mid 0 \le j < (n+t)\}$ | the transformed version of R using permutation $\sigma$ |
| n | number of relations which should determine R |
| t | number of check relations in R |

Output: true, if weave is correct; false, if fails correct check
I: FailCount=0
II: for j=0 to (t−1):
   A: Weave extract modulus $R_n^\sigma(v_{\sigma(n+j)}) = \tau$
   B: If $\tau$ does not equal $v_{\sigma(n+j)}$:FailCount=FailCount+1.
III: return: if $$FailCount \le \left\lfloor \frac{t}{2} \right\rfloor,$$

return true; else return false
End Check Decoding Weave Technique

Because there can be at most t/2 errors, not all (2r+t) choose 2r subsets of the received relations need to be tried. If t/2 errors exist and relations were paired with an adjacent relation (e.g., pair 0 is $\mu_0$, $\mu_1$, pair 1 is $\mu_2$, $\mu_3$ and so on), then there would be t/2 pairs not used in the extraction process. If each of these unused pairs contained at least one error, then the used pairs are error free. In other words, one of the these (r+t/2) choose r pair subsets would be an error free transformation.

A decoding technique can exhaust subsets of the received relations, such as by pairing adjacent relations. Such a technique may reduce computation time per subset, such as by performing the full transform only once and modifying the transform to match the new subset by performing a weave swap.

Decoding Technique
Input:

| | |
|---|---|
| v | the fixed word size (bits per word); generally, $v \in \{8, 16; 32; 64\}$ |
| $M = \{m_i \mid 0 \le i < q\}$ | set of irreducible degree v polynomials over $F_2$ |
| 2r | the number of words per plain text block |
| 2s | the added key words |
| $\{c_{\pi(j)} \mid 0 \le j < 2r + t − 1\}$ | v-bit cipher text words and their ordering $\pi$ $\pi$ is a permutation on the integers $0 \le j < 2(r + s)$ but only lower (2r + t) values needed. |

I: Generate key and set up system (assumes key generator is initialized with cryptovariable—i.e., long term key), such as the same was as was done for the encoding, using the same cryptovariable.
   A: Generate 2v(s+n) bits of key stream from the supplied key generator. Label the key bits
   $\{\bar{k}_j \mid 0 \le j < 2s\}$, where $\bar{k}_j$ is a v-bit word of key;
   $\{k_j \mid 0 \le j, n\}$, where $k_j$ is less than q=|M| and $k_i \ne k_j$ for al $i \ne j$
   B: Create the key relations: $v_j = (\bar{k}_j \mod m_{k_{2r+j}})$ for $0 \le j < 2s$.
   C: Create the cipher relations: $v_{2s+j} = \mu_{\pi(j)} = (c_{\pi(j)} \mod m_{n+\pi(j)})$ for $0 \le j < (2r+t)$.
   D: Initialize return relations: $\delta j = (0 \mod m_{k_j})$ for $0 \le j < 2r$.
II: Let a be a permutation on the integers $0 \le j < (2s+n)$, initialized with the identity permutation: $\sigma(j) = j$.

III: Let $$halfSpares = \left\lfloor \frac{t}{2} \right\rfloor \qquad lvl = 0$$

$$nVetted = 0 \qquad lvlVetted[j] = 0 \quad 0 \le j < \left\lfloor \frac{t}{2} \right\rfloor$$

IV: Perform weave transform to map $R=\{v_k \mid 0 \le j < (2(s+r)+t)\}$ into $R^\sigma$.
V: While lvl<halfSpares and the current $R^\sigma$ fails check decoding weave:
   A: for j=2(r+s+lvl) down to 2(nVetted+s):
      1: Weave Swap $R^\sigma$ at j and (j−1)
      2: Weave Swap $R^\sigma$ at (j−1) and j
   B: lvlVetted[lvl]=lvlVetted[lvl]+1;nVetted=nVetted+1
   C: if nVetted≥r and lvl<halfSpares /* go to a more significant level, as this level is exhausted */
      1: nVetted=nVetted−lvlVetted[lvl]
      2: lvlVetted [lvl]=0
      3: lvl=lvl+1
   D: else if (lvl>0) /*else if not at lowest level, go down to least significant level*/
      1: lvl=0
VI: Weave Extract Modulus to get plain words $\delta_j = R^\pi(\delta j)$ for $0 \le j < 2r$.
End Decoding Technique Hexadecimal shorthand is used for polynomials in $F_2[x]$. For example, $x^5+x^4+x^3+x = \Rightarrow 0x3a$.

Examples of using techniques discussed herein are now provided.

Example 1: Da Yen $\varepsilon = \mathbb{Z}$: Let
R={(2 mod 7); (5 mod 13); (1 mod 2)}
Q={(5 mod 7); (1 mod 13); (0 mod 2)}.
Then $\langle R \rangle = (135 \mod 182)$, with $\check{R}=135$ and $\hat{R}=182$ and $\langle Q \rangle = (40 \mod 182)$.
Notice that R+Q={(0 mod 7); (6 mod 13); (1 mod 2)}, $\langle R+Q \rangle = (175 \mod 182)$ and RQ={(3 mod 7); (5 mod 13); (0 mod 2)} and $\langle RQ \rangle = (122 \mod 182)$.
$= F_2[x]$: Let R={$(x^3+x+1 \mod x^4+x^4+1)$; $(x \mod x^2+x+1)$; $(1 \mod x+1)$}. Then $\langle R \rangle = (x^5 \mod x^7+x^6+x^4+1)$ with $\check{R}=x^5$ and $\hat{R}=x^7+x^6+x^4+1$.
End of Example 1.

Example 2: Equivalent Relation Subsets

Let $\varepsilon = F_{11}[x]$ with $$R = \begin{cases} \mu_1 = (8 \bmod x - 1), \\ \mu_2 = (1 \bmod x - 4), \\ \mu_3 = (7 \bmod x - 5), \\ \mu_4 = (0 \bmod x - 8), \\ \mu_5 = (7 \bmod x - 10) \end{cases}$$

$I = \{\mu_2, \mu_4, \mu_5\}$

The set I maps to the relation $\langle I \rangle = 2x^2+6x \mod (x^3+9x+10)$ while $\langle R \rangle = 3x^4+8x^3+7x^2+9x^2+3 \mod (x^5+5x^4+3x^3+7x^1+6)$.

Notice that $I(\mu_1)=\mu_1$. This, along with the fact that the size of all moduli in R are identical (degree 1), gives us that the following relation sets are equivalent:

$$I=\{\mu_1,\mu_4,\mu_5\}=\{\mu_1,\mu_2,\mu_5\}=\{\mu_1,\mu_2,\mu_4\}$$

End of Example 2.

Example 3: Integer Ya Den Weave Transform

Let R={(2 mod 3)(3 mod 5)(1 mod 11)(7 mod 13)}, find $\dot{R}$ mod 7.

|  | $\hat{\mu}_0 = 3$ | $\hat{\mu}_1 = 5$ | $\hat{\mu}_2 = 11$ | $\hat{\mu}_3 = 13$ |
|---|---|---|---|---|
| $w_k^{(0)}$ | 2 | 3 | 4 | 7 |
| $w_k^{(1)}$ | — | $3^{-1}(3-2)$ | $3^{-1}(1-2)$ | $3^{-1}(7-2)$ |
|  |  | 2(1) | 4(−1) | 9(5) |
|  |  | 2 | 7 | 6 |
| $w_k^{(2)}$ | — | — | $5^{-1}(7-2)$ | $5^{-1}(6-2)$ |
|  |  |  | 9(5) | 8(4) |
|  |  |  | 1 | 6 |
|  |  |  |  | $11^{-1}(6-1)$ |
|  |  |  |  | 6(5) |
|  |  |  |  | 4 |
| $R^\pi$ | (2 mod 3) | (2 mod 5) | (1 mod 11) | (4 mod 13) |

The full value of ⟨R⟩ would be ⟨R⟩+(2+3(2+5(1+11(4))))=683 mod 2145, but $\dot{R}$ mod 7 can be computed without the full value:

$$\dot{R} \equiv 2 + 3(2 + 5(1 + 11(4))) \bmod 7$$
$$\equiv 2 + 3(2 + 5(1 + 4(4))) \bmod 7$$
$$\equiv 2 + 3(2 + 5(3)) \bmod 7$$
$$\equiv 2 + 3(3) \bmod 7$$
$$\equiv 4 \bmod 7$$

Now divide $\dot{R}$ by 7 and return the quotient modulo 3, 5, 11, and 13. The reminder is already known: r=4. To find the quotient, subtract r and multiply by $7^{-1}$. The inverses of 7 mod $\hat{\mu}_i$ are:
[1 mod 3  3 mod 5  8 mod 11  2 mod 13].
Finally, the quotient is equivalent to:

$$q = 7^{-1}(\dot{R}-4)$$
$$\cong \begin{bmatrix} \text{mod3} & \text{mod5} & \text{mod11} & \text{mod13} \\ 1(2-4) \equiv 1 & 3(3-4) \equiv 2 & 8(1-4) \equiv 9 & 2(7-4) \equiv 6 \end{bmatrix}$$

The integer form of the quotient is $$\frac{683-4}{7} = 97.$$

Notice that
97≡[1 mod 3  2 mod 5  9 mod 11  6 mod 13]
End Example 3.

Example 4: Polynomial Ya Den Weave Transform

Let $\varepsilon=F_2[x]$, represent polynomials in hexadecimal: $x^5+x^3x^2 \to 0x2c$, and R={(0x6 mod 0x25), (0x1a mod 0x29), (0xc mod 0x2f), (0x3 mod 0x37)} and find $\dot{R}$ mod 0x3b:

|  | $\hat{\mu}_0 = 0x25$ | $\hat{\mu}_1 = 0x29$ | $\hat{\mu}_2 = 0x2f$ | $\hat{\mu}_3 = 0x37$ |
|---|---|---|---|---|
| $w_k^{(0)}$ | 0X6 | 0x1a | 0xc | 0x3 |
| $w_k^{(1)}$ | — | $0x25^{-1}$ | $0x25^{-1}$ | $0x25^{-1}(0x3\oplus0x6)$ |
|  |  | $(0x1a\oplus0x6)$ | $(0xc\oplus0x6)$ |  |
|  |  | $0xc^{-1}\,0x1c$ | $0xa^{-1}\,0xa$ | $0x12^{-1}\,0x5$ |
|  |  | $0x6 \cdot 0x1c$ | 0x1 | $0x3 \cdot 0x5$ |
|  |  | 0x1a | 0x1 | 0xf |
| $w_k^{(2)}$ | — | — | $0x29^{-1}$ | $0x29^{-1}(0xf\oplus0x1a)$ |
|  |  |  | $(0x1\oplus0x1a)$ | $0x10 \cdot 0x15$ |
|  |  |  | $0xd \cdot 0x1b$ | 0x3 |
|  |  |  | 0x13 |  |
| $w_k^{(3)}$ | — | — | — | $0x2f^{-1}(0x3\oplus0x13)$ |
|  |  |  |  | $0x14 \cdot 0x10$ |
|  |  |  |  | 0x13 |
| $w_j$ | (0x6 mod 0x25) | (0x1a mod 0x29) | (0x13 mod 0x2f) | (0x13 mod 0x37) |

R contains four degree 6 polynomials, therefore $|\hat{R}|=20$, but we can compute $\dot{R}$ mod 0x3b with the w values and operations mod 0x3b (note: all moduli have the same degree, therefore $\hat{w}_j \equiv (\hat{w}_j \oplus 0x3b) \bmod 0x3b)$:

$$\dot{R} \equiv 0x6 \oplus 0x25(0x1a \oplus 0x29(0x13 \oplus 0x2f \cdot 0x13)) \bmod 0x3b$$
$$\equiv 0x6 \oplus 0x1e(0x1a \oplus 0x12(0x13 \oplus 0x14 \cdot 0x13)) \bmod 0x3b$$
$$\equiv 0x6 \oplus 0x1e(0x1a \oplus 0x12 \cdot 0x16) \bmod 0x3b$$
$$\equiv 0x6 \oplus 0x1e \cdot 0x14 \bmod 0x3b$$
$$\equiv 0xb$$

To illustrate how a change in order effects the weave transform, use the same R but swap the order of $\mu_1, \mu_2$:
R={(0x6 mod 0x25), (0x1a mod 0x29), (0xc mod 0x2f), (0x3 mod 0x37)} and find $\dot{R}$ mod 0x3b:

|  | $\hat{\mu}_0 = 0x25$ | $\hat{\mu}_2 = 0x2f$ | $\hat{\mu}_1 = 0x29$ | $\hat{\mu}_3 = 0x37$ |
|---|---|---|---|---|
| $w_k^{(0)}$ | 0x6 | 0xc | 0x1a | 0x3 |
| $w_k^{(1)}$ | — | 0x1 | 0x1a | 0xf |
| $w_k^{(2)}$ | — | — | 0x10 | 0x4 |
| $w_k^{(3)}$ |  |  |  | 0x13 |
| $w_j$ | (0x6 mod 0x25) | (0x1 mod 0x2f) | (0x10 mod 0x29) | (0x13 mod 0x37) |

Notice that swapping the order of $\mu_1, \mu_2$ changes the intermediate results for $\mu_3$, but not the final value or the result $$\dot{R} \equiv 0x6 \oplus 0x25(0x1a \oplus 0x2f(0x10 \oplus 0x29 \cdot 0x13)) \bmod 0x3b$$
$$\equiv 0xb$$

The swapped transform can be computed using the weave swap technique. Using the original weave:

|  | $\hat{\mu}_0 = 0x25$ | $\hat{\mu}_1 = 0x29$ | $\hat{\mu}_2 = 0x2f$ | $\hat{\mu}_3 = 0x37$ |
|---|---|---|---|---|
| $w_j$ | (0x6 mod 0x25) | (0x1a mod 0x29) | (0x13 mod 0x2f) | (0x13 mod 0x37) |

It is known that $w_{\pi(0)}, w_{\pi(3)}$, where $\pi(0)=0, \pi(3)=3$, don't change. For the swapped values:

$$w_{\pi(1)} = w_2(0x29 \oplus 0x2f) \oplus w_1 \quad \pi(1) = 2$$
$$= 0x1 \bmod 0x2f$$
$$w_{\pi(2)} = (w_1 \oplus w_{\pi(1)})(0x29 \oplus 0x2f)^{-1} \quad \pi(2) = 1$$
$$= 0x10 \bmod 0x29$$

End of Example 4.

Entwined encryption provides an implementer more freedom in implementation than other systems, which require a standard data block size. Many encoding schemes have rather strict restrictions on block size, but entwined encryption allows a user to vary a block size, such as based on their needs.

Entwined encryption may provide a foundation for a quantum resistant public key cryptosystem. This is a new, important area of cryptography as all currently used public key systems are vulnerable to quantum attacks.

An example that works with polynomials over $F_2$ or modulo 2: $f(x) = \Sigma_{i=0} b_i x^i$ where $b_i \in \{0,1\}$ and x is a variable/placeholder. Arithemetic in this example is standard polynomial addition and multiplication, except coefficient addition and multiplication is done modulo 2: $1+1=1\oplus 1=0$. As the coefficients are restricted to $\{1,0\}$, polynomials can be written in short hand as hexadecimal numbers. For example, $0x11d=0b100011101=x^8+x^4+x^3+x^2+1$.

Modular reduction using polynomials over $F_2$ as the moduli is used in this example. If M(x) is the polynomial modulus, then $0 = M(x) \bmod M(x)$. This may seem like an obvious statement, but it may be used to simplify polynomial reduction. Let $M(x) = x^n + \Sigma_{j=0}^{n-1} b_j x^j$ (e.g., a degree n polynomial over $F_2$). Starting with the obvious relation, then adding $x^n$ to both sides (addition being the same as subtraction mod 2), gives: $x^n = \Sigma_{j=0}^{n-1} b_j x^j \bmod M(x)$. To reduce a polynomial $P(x) \bmod M(x)$, simply replace n-th powers with the lower terms of M(x) of add left shifted versions of M(x) until the degree is less than n. The following table, the polynomial, $P(x)=0x37f6$ is reduced modulo, M(x), $0x11d$.

| | | | | | | | | | | | | | |
|---|---|---|---|---|---|---|---|---|---|---|---|---|---|
| 1 | 1 | 0 | 1 | 1 | 1 | 1 | 1 | 1 | 1 | 0 | 1 | 1 | 0 |
| 1 | 0 | 0 | 0 | 1 | 1 | 1 | 0 | 1 | 0 | 0 | 0 | 0 | 0 |
| | 1 | 0 | 1 | 0 | 0 | 0 | 1 | 0 | 1 | 0 | 1 | 1 | 0 |
| | 1 | 0 | 0 | 0 | 1 | 1 | 1 | 0 | 1 | 0 | 0 | 0 | 0 |
| | | 0 | 1 | 1 | 0 | 0 | 0 | 0 | 0 | 1 | 1 | 1 | 0 |
| | | | 1 | 0 | 0 | 0 | 1 | 1 | 1 | 0 | 1 | 0 | 0 |
| | | | | 1 | 1 | 1 | 1 | 1 | 0 | 0 | 1 | 1 | 0 |
| | | | | 1 | 0 | 0 | 0 | 1 | 1 | 1 | 0 | 1 | |
| | | | | | 1 | 1 | 1 | 0 | 1 | 1 | 1 | 1 | 1 | which equals 0xef.

Multiplicative inverses (e.g., division) modulo these polynomials is a component of the ECE. The inverse of a mod m is b such that $ab=1 \bmod m$, and it is written $b=a^{-1} \bmod m$. Inverses can be computed in several ways which are not covered here. These include many variants of the Euclidean algorithm as well as the Da Yen.

Table 1 includes irreducible polynomials of degree 8 (in hexadecimal short-hand notation). Note that polynomial (j=0) is primitive. This means that every non-zero element of $F_2$ is generated by a root of the polynomial in the algebraic completion of $F_2$. If $\alpha$ is a root of $p_0(x)$, then a root of polynomial $p_j(x)$ is $\alpha^{exp}$. In the example encryption/encoding scheme below, these polynomials are referred to as $M_{id}(x)$.

TABLE 1

Irreducible Polynomials of Degree 8

| id | poly(hex) | exp |
|---|---|---|
| 0 | 11d | 1 |
| 1 | 177 | 3 |
| 2 | 1f3 | 5 |
| 3 | 169 | 7 |
| 4 | 1bd | 9 |
| 5 | 1e7 | 11 |
| 6 | 12b | 13 |
| 7 | 1d7 | 15 |
| 8 | 165 | 19 |
| 9 | 18b | 21 |
| 10 | 163 | 23 |
| 11 | 11b | 25 |
| 12 | 13f | 27 |
| 13 | 18d | 29 |
| 14 | 12d | 31 |
| 15 | 15f | 37 |
| 16 | 1f9 | 39 |
| 17 | 1e3 | 43 |
| 18 | 139 | 45 |
| 19 | 1a9 | 47 |
| 20 | 187 | 53 |
| 21 | 1b1 | 55 |
| 22 | 14d | 59 |
| 23 | 1ef | 61 |
| 24 | 1dd | 63 |
| 25 | 1a3 | 87 |
| 26 | 1f5 | 91 |
| 27 | 19f | 95 |
| 28 | 17b | 111 |
| 29 | 171 | 127 |

The following example encrypts/encodes a block of 24 bits (e.g., three 8-bit words) into five, 8-bit words. Plaintext bits are used as coefficients to a binary polynomial (an element of $F_2|x|$) with degree less than 24. A key stream is provided by a key generator (e.g., a stream cipher), such as can include a randomizer with a seed (e.g., an internal secret seed). This key stream provides integers in the range of the id of the set of irreducible polynomials. In this example the key stream provides integers in the range $0 \leq k_i < 30$. Thus, these keys serve as indices for the irreducible polynomials, $M_j(x)$ in Table 1.

Consider $P(x) = \Sigma_{i=0}^{23} b_i x^i$ where $b_i \in \{0,1\}$. ECE converts P(x) into five 8-bit words Cj where $Cj = P(x) \bmod M_{k_j}(x)$ for $0 \leq j < 5$. Decrypting and decoding using the given key integers uses a Da Yen weave transform.

There are at least two construction techniques to determine Cj. Assume there are n Cj values mod Mj for j=0, 1, 2, ..., (n−1). These may be the entire set of just a sub-set (if the product of Mj has a degree at least as large as the initial modulus (24 in this example)). The first technique can include using the following formula: $P(x) = \Sigma_{j=0}^{n-1} \Pi_{i \neq j} M_i(x) [(\Pi_{i \neq j} M_i(x))^{-1} C_j \bmod M_j(x)]$.

The second technique can include an iterative technique, such as can be more computationally efficient than the first technique. The iterative technique can follow these three formulas:

$$P_0(x) = C_0$$

$$P_j(x) = P_{j-1}(x) \oplus \left[\prod_{i=0}^{j-1} M_i(x) \left[\left(\prod_{i=0}^{j-1} M_i(x)\right)^{-1} (C_j \oplus P_{j-1}(x)) \bmod M_j(x)\right]\right]$$

$$P(x) = P_{n-1}(x)$$

For this example, let P(x)=0x23ab1f and the key integers be as shown in Table 2:

TABLE 2

Generated Key Values

| j | 0 | 1 | 2 | 3 | 4 |
|---|---|---|---|---|---|
| $k_j$ | 21 | 19 | 28 | 18 | 25 |

In this example, P(x) encrypts/encodes to:

$C_0 = 8b \bmod 1b1$ $C_1 = 86 \bmod 1a9$ $C_2 = 31 \bmod 17b$ $C_3 = e9 \bmod 139$ $C_4 = 73 \bmod 1a3$ If only $C_1$, $C_2$, and $C_4$ are recovered, and the keys are known, the full plain text can be recovered:

$$P(x) = (17b \cdot 1a3)[(17b \cdot 1a3)^{-1} 86 \bmod 1a9] \oplus (1a9 \cdot 1a3)$$
$$[(1a9 \cdot 1a3)^{-1} 31 \bmod 17b](1a9 \cdot 17b)[(1a9 \cdot 17b)^{-1} 73 \bmod 1a3]$$
$$= 1ea6d(39^{-1} 86 \bmod 1a9) \oplus 14a5b(ad^{-1} 31 \bmod 17b) \oplus 1e343$$
$$(5f^{-1} 73 \bmod 1a3)$$
$$= 1ea6d(f0 \cdot 86 \bmod 1a9) \oplus 14a5b(d2 \cdot 31 \bmod 17b) \oplus 1e343$$
$$(6d \cdot 73 \bmod 1a3)$$
$$= (1ea6d \cdot b5) \oplus (14a5b \cdot 2) \oplus (1e343 \cdot 80)$$
$$= d09e29 \oplus 294b6 \oplus f1a180$$

In this example, if all cipher words are known, an error may be corrected. For example, let the Cj received after transmission be {8b, 96, 31, e9, 73} (note the error in $C_1$=96, $C_1$ was determined to be 86).

$$P(x) = 113b9e5fd(4b^{-1} C_0 \bmod 1b1) \oplus 101f3e905(8f^{-1} C_1 \bmod 1a9) \oplus$$
$$1fbd82883(55^{-1} C_2 \bmod 17b) \oplus 18c8b0e55(14^{-1} C_3 \bmod 139) \oplus$$
$$10cd8495b(89^{-1} C_4 \bmod 1a3)$$
$$= 113b9e5fd(7c \cdot C_0 \bmod 1b1) \oplus 101f3e905(4a \cdot C_1 \bmod 1a9) \oplus$$
$$1fbd82883(c9 \cdot C_2 \bmod 17b) \oplus 18c8b0e55(16 \cdot C_3 \bmod 139) \oplus$$
$$10cd8495b(a6 \cdot C_4 \bmod 1a3)$$
$$= 89dcf2fe8 \oplus 1f157a4763 \oplus 2afb4e07c1 \oplus 8eab0882cf \oplus$$
$$4c76d9e299$$
$$= ffae2a0f1c \bmod M_0 M_1 M_2 M_3 M_4.$$

In only one error is in the blocks, then reducing this result modulo a smaller product (in this case $M_0 M_2 M_3 M_4$) can produce a polynomial with degree less than 24, the corrected plain text. Using a product containing $C_1 \bmod M_1$ returns a polynomial with a higher degree. The value reduced modulo the product of all moduli but one of (in order) $M_0, M_1, \ldots M_4$, is provided:

ffae2a0f1c=c3ba8b51 mod 113b9e5fd ($M_0$ removed, so $M_1 M_2 M_3 M_4$)
ffae2a0f1c=23ab1f mod 101f3e905 ($M_1$ removed, so $M_0 M_2 M_3 M_4$)
ffae2a0f1c=4e563719 mod 1fbd82883 ($M_2$ removed, so $M_0 M_1 M_3 M_4$)
ffae2a0f1c=b925b63f mod 18c8b0e55 ($M_3$ removed, so $M_0 M_1 M_2 M_4$)
ffae2a0f1c=d13bdbb9 mod 10cd8495b ($M_4$ removed, so $M_0 M_1 M_2 M_3$)

As can be seen, removing $M_1$ from the modulus recovers the original data 0x23ab1f.

Figure 5:
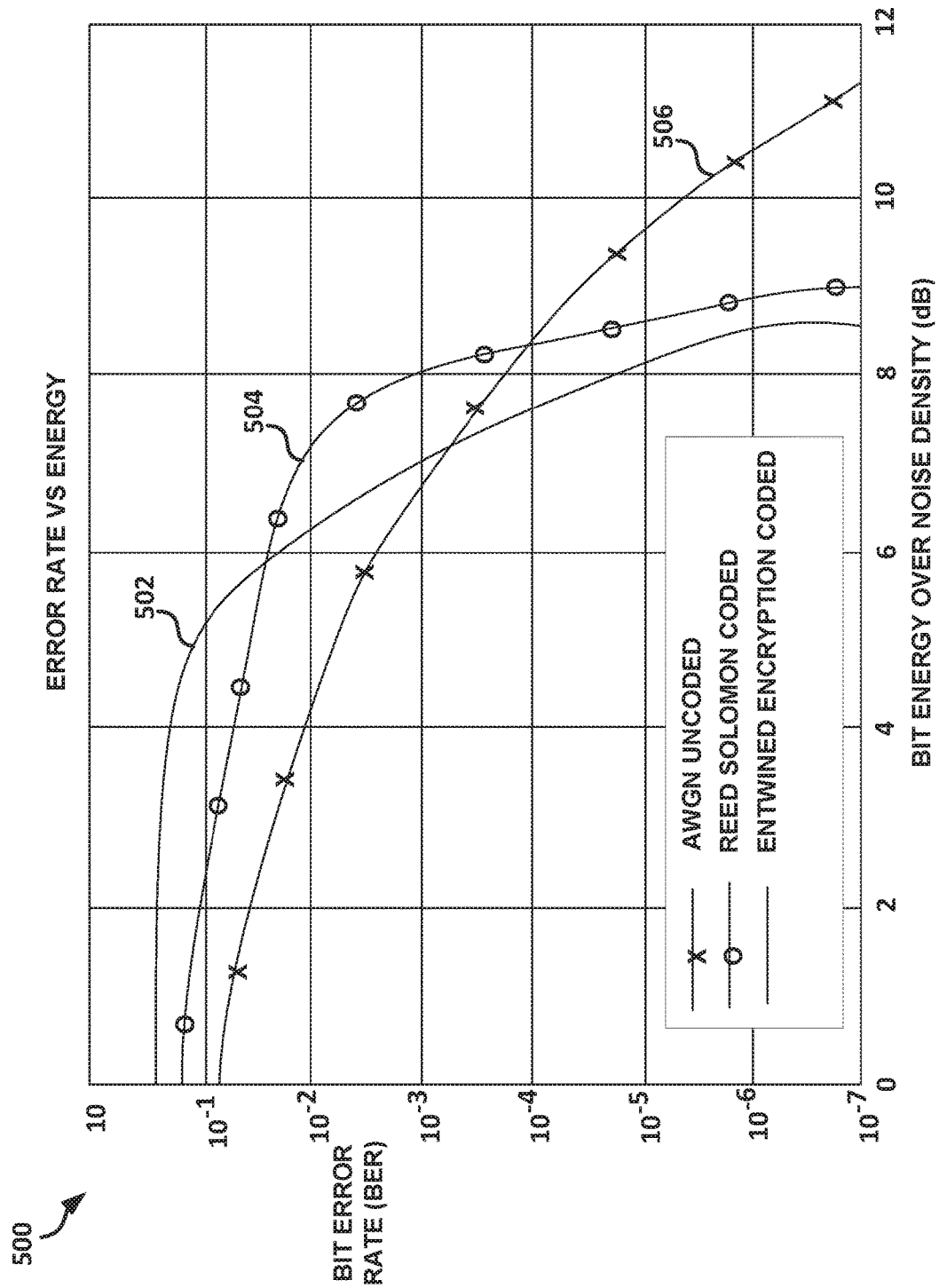
FIG. 5 illustrates, by way of example, a graph 500 of error rate versus energy for a variety of encoding techniques.

FIG. 5 illustrates, by way of example, a graph 500 of error rate versus energy for a variety of encoding techniques. The graph 500, as illustrated, includes uncoded data with added white Gaussian noise (AWGN) represented by line 506, data encoded using a Reed Solomon technique, represented by line 504, and data encoded using ECE, represented by line 502.

Figure 6:
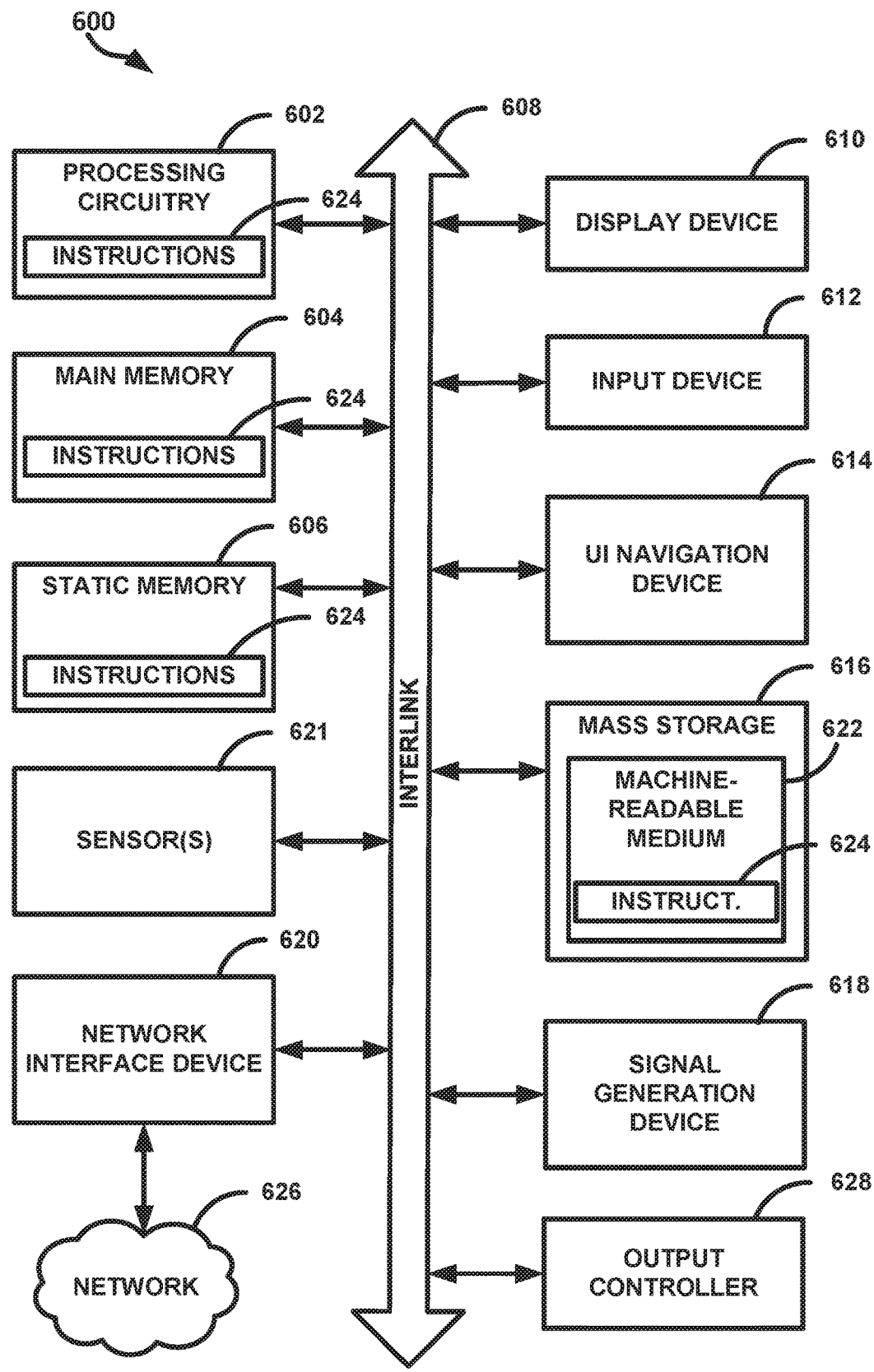
FIG. 6 illustrates, by way of example, a block diagram of an embodiment of a machine on which one or more of the methods as discussed herein can be implemented.

FIG. 6 illustrates, by way of example, a block diagram of an embodiment of a machine 600 on which one or more of the methods, such as those discussed with regard to FIGS. 3 and 4 and elsewhere herein can be implemented. In one or more embodiments, one or more items of the system 100 can be implemented by the machine 600. In alternative embodiments, the machine 600 operates as a standalone device or may be connected (e.g., networked) to other machines. In one or more embodiments, the entwined cryptographic encoder 102, the poly table 106, the key generator 104, the entwined cryptographic decoder 112, the poly table 116, the key generator 114, the medium 108, the encoding device 130 (the transmitter device), and/or the decoding device 140 (the receiver device) can include one or more of the items of the machine 600. In a networked deployment, the machine 600 may operate in the capacity of a server or a client machine in server-client network environment, or as a peer machine in a peer-to-peer (or distributed) network environment. The machine 600 may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 800 includes processing circuitry 902 (e.g., a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, radios (e.g., transmit or receive radios or transceivers), sensors 621 (e.g., a transducer that converts one form of energy (e.g., light, heat, electrical, mechanical, or other energy) to another form of energy), or the like, or a combination thereof), a main memory 604 and a static memory 606, which communicate with each other via a bus 608. The machine 600 (e.g., computer system) may further include a video display unit 610 (e.g., a liquid crystal display (LCD) or a cathode ray tube (CRT)). The machine 600 also includes an alphanumeric input device 612 (e.g., a keyboard), a user interface (UI) navigation device 614 (e.g., a mouse), a disk drive or mass storage unit 616, a signal generation device 618 (e.g., a speaker) and a network interface device 620.

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the machine 600, the main memory 604 and the processor 602 also constituting machine-readable media.

The machine 600 as illustrated includes an output controller 628. The output controller 628 manages data flow to/from the machine 600. The output controller 628 is sometimes called a device controller, with software that directly interacts with the output controller 628 being called a device driver.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of several well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Examples and Additional Notes

Example 1 can include an entwined cryptographic encode device comprising a memory including data indicating a set of relatively prime, irreducible polynomials stored and indexed thereon in a polynomial table, entwined cryptographic encoding circuitry to receive data, transform the data to a set of data integers modulo respective polynomial integers representative of respective polynomials of the polynomial table, and perform a Da Yen weave on the transformed data based on received cipher data, and provide the weaved transformed data to a medium.

In Example 2, Example 1 can further include key generator circuitry to produce a cipher stream of data based on a key, and wherein the entwined cryptographic encoding circuitry is further configured to transform the data to a set of data integers modulo respective polynomial integers and perform the Da Yen weave based on the received cipher stream.

In Example 3, Example 2 can further include, wherein another portion of the cipher stream provides an index to the respective polynomials.

In Example 4, Example 3 can further include, wherein the polynomials are indexed based on a respective root and primitive of the polynomials.

In Example 5, at least one of Examples 1-4 can further include, wherein the weaved transformed data includes the transformed received data and transformed cipher data transformed, by the entwined cryptographic encoding circuitry, based on data from the cipher stream.

In Example 6, at least one of Examples 1-5 can further include, wherein the entwined cryptographic encoding circuitry is further configured to split the received data into blocks of v-bit words, wherein the transformation of the data includes transformation of the blocks of v-bits words individually, and wherein v is a maximum degree of the polynomials in the memory.

In Example 7, at least one of Example 1-6 can further include, wherein a number of t-bit cipher words provided by the cipher stream includes the number of words in a block of the blocks, 2r, plus two times a maximum number of errors to be correctd, s, and a number of v-bit cipher words provided by the cipher stream includes two times the maximum number of errors to be correctd, wherein the weaved transformed data includes transformed versions of each of the v-bit words of the data block and transformed versions of the 2s, v-bit words from the cipher stream, wherein the number of polynomials in the memory is $2^r$.

Example 8 includes an entwined cryptographic decode device comprising a memory including data indicating a set of relatively prime, irreducible polynomials stored and indexed thereon in a polynomial table, entwined cryptographic decoding circuitry to receive encrypted, encoded data, perform a Da Yen weave transform on a portion the encrypted, encoded data, compare the transformed data to another portion of the encrypted, encoded data to determine if errors exist in the transformed data, in response to a determination that no errors exist, convert the error-free version of data to plaintext, and provide the plaintext to a receiver.

In Example 9, Example 8 further includes, wherein the entwined cryptographic decoding circuitry is further configured to in response to a determination that errors exist, perform a weave swap on two words of the transformed data, and compare the weave swapped data to a different portion of the encrypted, encoded data to determine if errors exist in the weave swapped version.

In Example 10, Example 9 can further include key generator circuitry to produce a cipher stream of data based on a key, and wherein the entwined cryptographic decoding circuitry is further configured to transform the encrypted encoded data to a set of data integers modulo respective polynomial integers and perform the Da Yen weave transform based on the received cipher stream.

In Example 11, Example 10 can further include, wherein another portion of the cipher stream provides an index to respective polynomials represented by respective polynomial integers.

In Example 12, Example 11 can further include, wherein the polynomials are indexed based on a respective root and primitive of the polynomials.

In Example 13, at least one of Examples 8-12 can further include, wherein the weave transformed data includes the transformed received data and transformed cipher data transformed, by the entwined cryptographic decoding circuitry, based on data from the cipher stream.

In Example 14, at least one of Examples 8-13 can further include, wherein v is a maximum degree of the polynomials in the memory, wherein a number of t-bit cipher words provided by the cipher stream includes the number of words in a block of the blocks, 2r, plus two times a maximum number of errors to be correctd, s, and a number of v-bit cipher words provided by the cipher stream includes two times the maximum number of errors to be correctd, wherein the weaved transformed data includes transformed versions of each of the v-bit words of the data block and transformed versions of the 2s, v-bit words from the cipher stream, wherein the number of polynomials in the memory is $2^r$.

In Example 15, an encryption and decryption system includes an entwined cryptographic encode device comprising a first memory including data indicating a set of relatively prime, irreducible polynomials stored and indexed thereon in a first polynomial table, entwined cryptographic encoding circuitry to receive data, transform the data to a set of data integers modulo respective polynomial integers representative of respective polynomials of the polynomial table, perform a Da Yen weave on the transformed data based on received cipher data, and provide the weaved transformed data to a medium, and an entwined cryptographic decode device comprising a second memory including data indicating the set of relatively prime, irreducible polynomials stored and indexed thereon in a second polynomial table, entwined cryptographic decoding circuitry to receive the encrypted, encoded data from the medium, perform a Da Yen weave transform on a first portion the encrypted, encoded data, compare the transformed data to a second portion of the encrypted, encoded data to determine if errors exist in the transformed data, in response to a determination that no errors exist, convert the error-free version of data to plaintext, and provide the plaintext to a receiver.

In Example 16, Example 15 may further include, wherein the entwined cryptographic encode device further includes first key generator circuitry to produce a first cipher stream of data based on a first key, and wherein the entwined cryptographic encoding circuitry is further configured to transform the data to a set of data integers modulo respective polynomial integers and perform the Da Yen weave based on the received first cipher stream, and the entwined cryptographic decode device further includes second key generator circuitry to produce a second cipher stream of data based on a second key, and wherein the entwined cryptographic decoding circuitry is further configured to transform the encrypted encoded data to a set of data integers modulo respective polynomial integers and perform the Da Yen weave transform based on the received second cipher stream.

In Example 17, Example 16 can further include, wherein the first and second key generator circuitry are synced In Example 18, at least one of Examples 16-17 can further include, wherein a portion of the first cipher stream provides an index to the respective polynomials on the first memory and wherein a portion of the second cipher stream provides an index to the respective polynomials on the second memory.

In Example 19, Example 18 can further include, wherein the polynomials on the first and second memories are indexed based on a respective root and primitive of the polynomials.

In Example 20, at least one of Examples 16-19 can further include, wherein the entwined cryptographic decoding circuitry is further configured to, in response to a determination that errors exist, perform a weave swap on two words of the transformed data, and compare the weave swapped data to a different portion of the encrypted, encoded data to determine if errors exist in the weave swapped version.

In Example 21, at least one of Examples 16-20 can further include, wherein the weaved transformed data includes the transformed received data and transformed cipher data transformed, by the entwined cryptographic encoder circuitry, based on data from the cipher stream.

In Example 22, at least one of Examples 16-21 can further include, wherein the entwined encryption circuitry is further to split the received data into blocks of v-bit words, and transformation of the data includes transformation of the blocks of v-bits words individually, wherein v is a maximum degree of the polynomials in the memory.

In Example 23, at least one of Examples 16-22 can further include, wherein a number of t-bit cipher words provided by the first and second cipher streams includes the number of words in a block of the blocks, 2r, plus two times a maximum number of errors to be correctd, s, and a number of v-bit cipher words provided by the cipher stream includes two times the maximum number of errors to be correctd, wherein the weaved transformed data includes transformed versions of each of the v-bit words of the data block and transformed versions of the 2s, v-bit words from the cipher stream, wherein the number of first and second polynomials in the first and second memories is $2^r$.

In Example 24, at least one of Examples 16-23 can further include, wherein another portion of the first cipher stream provides an index to first respective polynomials represented by respective polynomial integers.

In Example 25, at least one of Examples 16-24 can further include, wherein the first polynomials are indexed based on a respective root and primitive of the polynomials.

In Example 26, at least one of Examples 16-25 can further include, wherein the weave transformed data includes the transformed received data and transformed cipher data transformed, by the entwined cryptographic decoding circuitry, based on data from the cipher stream.

Example 27 can include a method for entwined cryptographic encoding storing, on a memory, data indicating a set of relatively prime, irreducible polynomials stored and indexed thereon in a polynomial table, receiving data, at entwined cryptographic encoding circuitry, transforming the data to a set of data integers modulo respective polynomial integers representative of respective polynomials of the polynomial table, performing a Da Yen weave on the transformed data based on received cipher data, and providing the weaved transformed data to a medium.

In Example 28, Example 27 can further include producing, using key generator circuitry, a cipher stream of data based on a key, and wherein the entwined cryptographic encoding circuitry is further configured to transform the data to a set of data integers modulo respective polynomial integers and perform the Da Yen weave based on the received cipher stream.

In Example 29, Example 28 can further include, wherein another portion of the cipher stream provides an index to the respective polynomials.

In Example 30, at least one of Examples 27-29 can further include, wherein the polynomials are indexed based on a respective root and primitive of the polynomials.

In Example 31, at least one of Examples 27-30 can further include, wherein the weaved transformed data includes the transformed received data and transformed cipher data transformed, by the entwined cryptographic encoding circuitry, based on data from the cipher stream.

In Example 32, at least one of Examples 27-31 can further include splitting the received data into blocks of v-bit words, wherein the transformation of the data includes transformation of the blocks of v-bits words individually, and wherein v is a maximum degree of the polynomials in the memory.

In Example 33, at least one of Example 27-32 can further include, wherein a number of t-bit cipher words provided by the cipher stream includes the number of words in a block of the blocks, 2r, plus two times a maximum number of errors to be correctd, s, and a number of v-bit cipher words provided by the cipher stream includes two times the maximum number of errors to be correctd, wherein the weaved transformed data includes transformed versions of each of the v-bit words of the data block and transformed versions of the 2s, v-bit words from the cipher stream, wherein the number of polynomials in the memory is $2^t$.

Example 34 includes a method of entwined cryptographic decoding including storing, on a memory, data indicating a set of relatively prime, irreducible polynomials stored and indexed thereon in a polynomial table, receiving, at entwined cryptographic decoding circuitry, encrypted, encoded data, performing a Da Yen weave transform on a portion the encrypted, encoded data, comparing the transformed data to another portion of the encrypted, encoded data to determine if errors exist in the transformed data, in response to a determination that no errors exist, converting the error-free version of data to plaintext, and providing the plaintext to a receiver.

In Example 35, Example 34 further includes, in response to a determination that errors exist, performing a weave swap on two words of the transformed data, and compare the weave swapped data to a different portion of the encrypted, encoded data to determine if errors exist in the weave swapped version.

In Example 36, Example 35 can further include producing, using key generator circuitry, a cipher stream of data based on a key, and transforming the encrypted encoded data to a set of data integers modulo respective polynomial integers and perform the Da Yen weave transform based on the received cipher stream.

In Example 37, Example 36 can further include, wherein another portion of the cipher stream provides an index to respective polynomials represented by respective polynomial integers.

In Example 38, Example 37 can further include, wherein the polynomials are indexed based on a respective root and primitive of the polynomials.

In Example 39, at least one of Examples 34-38 can further include, wherein the weave transformed data includes the transformed received data and transformed cipher data transformed, by the entwined cryptographic decoding circuitry, based on data from the cipher stream.

In Example 40, at least one of Examples 34-39 can further include, wherein v is a maximum degree of the polynomials in the memory, wherein a number of t-bit cipher words provided by the cipher stream includes the number of words in a block of the blocks, 2r, plus two times a maximum number of errors to be correctd, s, and a number of v-bit cipher words provided by the cipher stream includes two times the maximum number of errors to be correctd, wherein the weaved transformed data includes transformed versions of each of the v-bit words of the data block and transformed versions of the 2s, v-bit words from the cipher stream, wherein the number of polynomials in the memory is $2^t$.

Example 41 can include a non-transitory machine-readable medium including instructions that, when executed by a machine, configure the machine to perform operations of the method of at least one of Examples 27-40.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

APPENDIX

A: Proofs for Woven Transform and Encoding

Lemma (Iterative Da Yen): Let $R=\{\mu_j|0 \leq j < n\}$ be a set of relatively prime relations. Define the partial set $R_t = \{\mu_j | 0 \leq j < t\}$, $\langle R_t \rangle = \Pi_{j=0}^{t-1} \hat{\mu}_j$ for $0 < t \leq n$ and $$\langle R_1 \rangle = \mu_0$$

$$w_{t-1} = (\langle \hat{R}_{t-1} \rangle)^{-1} (\dot{\mu}_{t-1} - \langle \dot{R}_{t-1} \rangle) \bmod \hat{\mu}_{t-1}$$

$$\langle \dot{R}_t \rangle = \langle \dot{R}_{t-1} \rangle + \langle \hat{R}_{t-1} \rangle \dot{w}_{t-1}$$

for $1 < t \leq n$. Then $\langle \dot{R}_t \rangle \equiv \mu_j$ for all $0 \leq j < t$.

Proof. With the set of relations $R_t$, the Da Yen maps the direct product $\Pi_{\mu \in R_t} F[x]/\hat{\mu}F[x]$ to the factor ring $F[x]/(\Pi_{\mu \in R_t}\hat{\mu})F[x]$. Therefore $\langle \hat{R}_t \rangle = \Pi_{j=0}^{t-1}\hat{\mu}_j$. All that is left to prove is that $\langle \dot{R}_t \rangle \equiv \mu$ for all $\mu \in R_t$ and $|\langle \dot{R}_t \rangle| < |\hat{R}_t|$. These are both done by induction.

t=1: For t=1, R1=$\{\mu_0\}$. By definition $|\dot{\mu}_0| < |\hat{\mu}_0|$ and is equivalent to itself. Assume $|\langle \dot{R}_t \rangle| < |\hat{R}_t|$ and $\langle \dot{R}_t \rangle \equiv \mu$ for all $\mu \in R_t$ for t=2, 3, ..., (k−1).

t=k: If $\mu \in R_{k-1}$, then $\langle \hat{R}_{k-1} \rangle \equiv 0 \bmod \hat{\mu}$, therefore $\langle \dot{R}_k \rangle \equiv \langle \dot{R}_{k-1} \rangle \bmod \hat{\mu}$. Since $\langle \dot{R}_{k-1} \rangle \equiv \mu$ it is known that $\langle \dot{R}_k \rangle \equiv \mu$. The only relation in $R_k$ and not in $R_{k-1}$ is $\mu_{k-1}$. But:

$$\langle \dot{R}_k \rangle \equiv \langle R_{k-1}' \rangle + \langle \hat{R}_{k-1} \rangle (\langle \hat{R}_{k-1} \rangle^{-1} (\mu_{k-1} - \langle R_{k-1}' \rangle))$$
$$\bmod \hat{\mu}_{k-1}$$
$$\equiv \langle R_{k-1}' \rangle + (\mu_{k-1} - \langle R_{k-1}' \rangle) \bmod \hat{\mu}_{k-1}$$
$$\equiv \mu_{k-1} \bmod \hat{\mu}_{k-1}$$

therefore $\langle \dot{R}_k \rangle \equiv \mu$ for all $\mu \in R_k$.

$$|\langle \hat{R}_k \rangle| = deg(\langle R_{k-1} \rangle) + \langle \hat{R}_{k-1} \rangle$$

$$(\langle \hat{R}_{k-1} \rangle^{-1}(\mu_{k-1} - \langle R_{k-1} \rangle \bmod \hat{\mu}_{k-1}))$$

$$= deg(\langle \hat{R}_{k-1} \rangle)(\langle \hat{R}_{k-1} \rangle^{-1})(\mu_{k-1} - \langle R_{k-1} \rangle \bmod \hat{\mu}_{k-1}))$$

$$< deg(\langle \hat{R}_{k-1} \rangle) + deg(\mu_{k-1})$$

$$< deg(\langle \hat{R}_k \rangle)$$

Therefore, by induction, the function generates the value for the Da Yen relation.

Lemma (Weave Terms): Let $R=\{\mu_k|0 \leq k<n\}$ be a set of n relatively prime relations. If $$W_k^{(0)} = \mu_k k = 0, 1, \ldots, (n-1)$$

$$W_k^{(j)} = \hat{\mu}_{j-1}^{-1}(w_k^{(j-1)} - w_{j-1}^{(j-1)}) \bmod \hat{\mu}_{k-1} \; 1 \leq j \leq k < n$$

and $$w_k(\dot{w}_k^{(k)} \bmod \hat{\mu}_k)$$

Then $w_k$ are the weaving relations needed in the iterative Da Yen.

Proof: the following will prove that
$w_k^{(j)} = (\langle \hat{R}_j \rangle^{-1}(\hat{\mu}_k - \langle R_j \rangle)) \bmod \hat{\mu}_k$ for all $0 \leq j \leq k<n$,
and $w_k = w_k^{(k)}$. By definition, $w_k^{(0)} = w_0 = a_k$. By induction on j:

For j=1: $A_0 = a_0 = w_0 = w_0^{(0)}$ therefore
$w_k^{(1)} = m_0^{-1}(w_k^{(0)} - w_0^{(0)}) \equiv M_0^{-1} (a_k - A_0) \bmod m_k$ for all $1 \leq k<n$. Furthermore,
$w_1^{(1)} \equiv M_0^{-1}(a_k - A_0) \equiv w_1 \bmod m_1$.
Assume $w_k^{(j)} \equiv M_{j-1}^{-1}(a_k - A_{j-1}) \bmod m_k$, $w_j = w_j^{(j)}$ for $1 \leq j<t$ and all $j \leq k<n$.
Then $w_k^{(t)}$ for $t \leq k<n$ is:

$$w_k^{(t)} \equiv m_{t-1}^{-1}(w_k^{(t-1)} - w_{t-1}^{(t-1)}) \bmod m_k$$

$$\equiv m_{t-1}^{-1}(M_{t-2}^{-1}(a_k - A_{t-2}) - w_{t-1}) \bmod m_k$$

$$\equiv M_{t-1}^{-1}(a_k - (A_{t-2} + M_{t-2} w_{t-1})) \bmod m_k$$

It is known that $A_{t-1} = A_{t-2} + M_{t-2} w_{t-1}$, therefore
$w_k^{(t)} \equiv M_{t-1}^{-1}(a_k - A_{t-1}) \bmod m_k$ and
$w_t = w_t^{(t)} \equiv M_{t-1}^{-1}(a_t - A_{t-1}) \bmod m_k$.

Proof of Error Correction Capabilities

Forcing the number of words used in the encoding to be even reduces computational cost, so in this description there will be 2r relations for plain text and 2s correction relations: $R=\{\mu_j|0 \leq j<2(r+s)\}$. Any subset $I \subset R$ with $|I| \geq 2r$ determines all $2(r+s)$ relations in R. In other words, $I(\mu)=\mu$ for all $\mu \in R$. Using the corrupted set R', any 2r sized subset $I \subset R'$ is not guaranteed to have $I(\mu')=\mu'$ for all $\mu' \in R'$.

However, the following proof will show that if there are at most s errors in R' and I generates no more than s non-matching relations, then I contains no errors and $R=\{I(\mu'_j) | \mu'_j \in R'\}$.

The following set definitions help solidify the concepts and simplify the proof. The sets G, B contain the actual correct and corrupted relations, while GI, BI contain the observed correct and corrupted relations derived with a subset $I \in R'$.

$$G = \{\mu'_j \in R' | e_j = 0\}$$

$$B = \{\mu'_j \in R' | e_j \neq 0\} \quad (13)$$

$$G_I = \{\mu' \in R' | I(\mu') = \mu'\}$$

$$B_I = \{\mu' \in R' | I(\mu') \neq \mu'\} \quad (14)$$

Notice that:
1) Both pairs, G, B, and GI, BI partition the set of observed relations R':

$$R' = G \cap B \emptyset = G \cup B$$

$$R' = G_I \cap B_I \emptyset = G_I \cup B_I$$

2) The sets G, B depend only on R and R'.
3) The sets GI, BI depend only on the results of $\langle I \rangle$, therefore if I, J are equivalent, $\langle I \rangle \equiv \langle J \rangle$ and $G_I = G_J$ and $B_I = B_J$.

The following shows that if there are no more than s computed errors from I (e.g., $|K_I| \leq s$), then there are no errors in I and, since the relations are determined by a set of 2r elements, existing errors (e.g., relations in $K_I$) can be corrected with $I(\mu')=\mu$. In the following theorem:

1. $R=\{\mu_j|0 \leq j<2(r+s)\}$ is a set of equally sized relatively prime relations over a Euclidean domain, uniquely determined by any subset $I \subset R$ of 2r elements. $I(\mu)=\mu$ for all $\mu \in R$.
2. $R'=\{\mu'_j = \mu_j + e_j | e_j \in E, 0 \leq j<2(r+s)\}$ is the set R corrupted by a set of errors.

This encoding scheme is essentially an application of the Da Yen. The proof relies on the following theorem:

Let $R=\{\mu_j|0 \leq j<2(r+s)\}$ be a set of relatively prime relations over uniquely determined 2r or more elements. Let the set with added errors be $R'=\{\mu'_j = \mu_j + e_j | e_j \in E, 0 \leq j<2(r+s)\}$ with at most s non-zero $e_j$. If $I \subset R'$ with $|I|=2r$, then $|B_I| \leq s$ if and only if $I \subset G$.

Proof: Let R, R' be defined as above with $I \subset R'$ a subset with 2r elements. All subsets $J \subset G_I$ with $|J|=|I|$ are equivalent to I:

1. If $I \subset G$, then $(\mu)=\mu$ for all $\mu \in R$ and $|B_I|=|B| \leq s$.
2. If $|B_I| \leq s$:
   a. $|G_I|=|R'|-|B_I| \geq 2(r+s)-s=2r+s$.
   b. Since $|G_I \cup B| \leq s$, $|G_I \cup G|=|G_I|-|G_I \cup B| \geq 2(r+s)-s=2r+s$.
   c. Therefore, there exists $J \subset (G_I \cup G)$ with $|J|=2r$ and $J=I$.
   d. Finally, since $J \subset G$ and $J=I$, $\langle I \rangle \equiv \langle J \rangle$ which implies $\mu'=I(\mu')=\mu$ for all $\mu' \in I$ and $I \subset G$.

| | |
|---|---|
| $\mu$ | relation $\mu = (\hat{\mu} \bmod \hat{\mu})$; generally lower case Greek |
| $\hat{\mu}$ | modulus in relation $\mu$ |
| $\dot{\mu}$ | value, with $|\dot{\mu}| < |\hat{\mu}|$ |
| R | Set of relatively prime relations; generally upper case Latin |
| $\langle R \rangle$ | Relation with modulus$\langle \hat{R} \rangle = \Pi_{\mu \in R} \hat{\mu}$ and value $\langle \dot{R} \rangle = \mu$ for all $\mu \in R$. |
| $\hat{R}$ | Modulus for$\langle R \rangle$, or $\langle \hat{R} \rangle = \Pi_{\mu \in R} \hat{\mu}$ |
| $\dot{R}$ | Value for$\langle R \rangle$, or $\langle \dot{R} \rangle$ |
| $R(\mu)$ | The relation generated by $(\dot{R} \bmod \hat{\mu})$ |
| $R_t^\pi$ | The first t elements of weave transform of R permuted by $\pi$: $R_t^\pi = \{w_{\pi(j)} \mid 0 \leq j < t\}$ |

What is claimed is:

1. An entwined cryptographic encode device comprising:
   a memory including data indicating a set of relatively prime, irreducible polynomials stored and indexed thereon in a polynomial table;
   entwined cryptographic encoding circuitry to:
   receive data;
   transform the data to a set of data integers modulo respective polynomial integers representative of respective polynomials of the polynomial table; and perform a Da Yen weave on the transformed data based on received cipher data; and provide the weaved transformed data to a medium.

2. The device of claim 1, further comprising:

key generator circuitry to produce a cipher stream of data based on a key; and wherein the entwined cryptographic encoding circuitry is further configured to transform the data to a set of data integers modulo respective polynomial integers and perform the Da Yen weave based on the received cipher stream.

3. The device of claim 2, wherein another portion of the cipher stream provides an index to the respective polynomials.

4. The device of claim 3, wherein the polynomials are indexed based on a respective root and primitive of the polynomials.

5. The device of claim 4, wherein the weaved transformed data includes the transformed received data and transformed cipher data transformed, by the entwined cryptographic encoding circuitry, based on data from the cipher stream.

6. The device of claim 5, wherein the entwined cryptographic encoding circuitry is further configured to:

split the received data into blocks of v-bit words;

wherein the transformation of the data includes transformation of the blocks of v-bits words individually; and wherein v is a maximum degree of the polynomials in the memory.

7. The device of claim 6, wherein a number of t-bit cipher words provided by the cipher stream includes the number of words in a block of the blocks, 2r, plus two times a maximum number of errors to be correctd, s, and a number of v-bit cipher words provided by the cipher stream includes two times the maximum number of errors to be correctd, wherein the weaved transformed data includes transformed versions of each of the v-bit words of the data block and transformed versions of the 2s, v-bit words from the cipher stream, wherein the number of polynomials in the memory is $2^t$.

8. An entwined cryptographic decode device comprising:

a memory including data indicating a set of relatively prime, irreducible polynomials stored and indexed thereon in a polynomial table;

entwined cryptographic decoding circuitry to:

receive encrypted, encoded data;

perform a Da Yen weave transform on a portion the encrypted, encoded data;

compare the transformed data to another portion of the encrypted, encoded data to determine if errors exist in the transformed data;

in response to a determination that no errors exist, convert the error-free version of data to plaintext; and provide the plaintext to a receiver.

9. The device of claim 8, wherein the entwined cryptographic decoding circuitry is further configured to:

in response to a determination that errors exist, perform a weave swap on two words of the transformed data; and compare the weave swapped data to a different portion of the encrypted, encoded data to determine if errors exist in the weave swapped version.

10. The device of claim 9, further comprising:

key generator circuitry to produce a cipher stream of data based on a key; and wherein the entwined cryptographic decoding circuitry is further configured to transform the encrypted encoded data to a set of data integers modulo respective polynomial integers and perform the Da Yen weave transform based on the received cipher stream.

11. The device of claim 10, wherein another portion of the cipher stream provides an index to respective polynomials represented by respective polynomial integers.

12. The device of claim 11, wherein the polynomials are indexed based on a respective root and primitive of the polynomials.

13. The device of claim 12, wherein the weave transformed data includes the transformed received data and transformed cipher data transformed, by the entwined cryptographic decoding circuitry, based on data from the cipher stream.

14. The device of claim 13, wherein v is a maximum degree of the polynomials in the memory, wherein a number of t-bit cipher words provided by the cipher stream includes the number of words in a block of the blocks, 2r, plus two times a maximum number of errors to be correctd, s, and a number of v-bit cipher words provided by the cipher stream includes two times the maximum number of errors to be correctd, wherein the weaved transformed data includes transformed versions of each of the v-bit words of the data block and transformed versions of the 2s, v-bit words from the cipher stream, wherein the number of polynomials in the memory is $2^t$.

15. An encryption and decryption system comprising:

an entwined cryptographic encode device comprising:

a first memory including data indicating a set of relatively prime, irreducible polynomials stored and indexed thereon in a first polynomial table;

entwined cryptographic encoding circuitry to:

receive data;

transform the data to a set of data integers modulo respective polynomial integers representative of respective polynomials of the first polynomial table; and perform a Da Yen weave on the transformed data based on received cipher data; and provide the weaved transformed data to a medium; and an entwined cryptographic decode device comprising:

a second memory including data indicating the set of relatively prime, irreducible second polynomials stored and indexed thereon in a second polynomial table;

entwined cryptographic decoding circuitry to:

receive the encrypted, encoded data from the medium;

perform a Da Yen weave transform on a first portion the encrypted, encoded data;

compare the transformed data to a second portion of the encrypted, encoded data to determine if errors exist in the transformed data;

in response to a determination that no errors exist, convert the error-free version of data to plaintext; and provide the plaintext to a receiver.

16. The system of claim 15, wherein:

the entwined cryptographic encode device further includes:

first key generator circuitry to produce a first cipher stream of data based on a first key; and wherein the entwined cryptographic encoding circuitry is further configured to transform the data to a set of data integers modulo respective polynomial integers and perform the Da Yen weave based on the received first cipher stream; and the entwined cryptographic decode device further includes:

second key generator circuitry to produce a second cipher stream of data based on a second key; and wherein the entwined cryptographic decoding circuitry is further configured to transform the encrypted encoded data to a set of data integers modulo respective polynomial integers and perform the Da Yen weave transform based on the received second cipher stream.

17. The system of claim 16, wherein the first and second key generator circuitry are synced.

18. The system of claim 16, wherein a portion of the first cipher stream provides an index to the respective polynomials on the first memory and wherein a portion of the second cipher stream provides an index to the respective polynomials on the second memory.

19. The system of claim 18, wherein the polynomials on the first and second memories are indexed based on a respective root and primitive of the polynomials.

20. The system of claim 16, wherein the entwined cryptographic decoding circuitry is further configured to:

in response to a determination that errors exist, perform a weave swap on two words of the transformed data; and compare the weave swapped data to a different portion of the encrypted, encoded data to determine if errors exist in the weave swapped version.

* * * * *

UNITED STATES PATENT AND TRADEMARK OFFICE
CERTIFICATE OF CORRECTION

PATENT NO. : 10,333,698 B2  
APPLICATION NO. : 15/667111  
DATED : June 25, 2019  
INVENTOR(S) : Shamee et al.

Page 1 of 3

It is certified that error appears in the above-identified patent and that said Letters Patent is hereby corrected as shown below:

In the Specification

In Column 3, Line 4, delete ""1""" and insert --"1"-- therefor

In Column 3, Line 62, delete "encrypted" and insert --cryptographic-- therefor

In Column 4, Line 16, delete "crypto" and insert --cryptographic-- therefor

In Column 5, Line 46, delete "correctd," and insert --corrected,-- therefor

In Column 6, Line 23, delete "correctd," and insert --corrected,-- therefor

In Column 6, Line 25, delete "correctd," and insert --corrected,-- therefor

In Column 6, Line 40, delete "101)." and insert --102).-- therefor

In Column 7, Line 10, delete "$v_j = (\overline{k}_j \bmod m_{k_{2r+1}})$," and insert --$v_j = (\overline{k}_j \bmod m_{k_{2r+j}})$.-- therefor In Column 7, Line 23, delete "E" and insert --ε-- therefor In Column 7, Line 25, delete "$\hat{\mu}$" and insert --$\hat{\mu}$-- therefor In Column 7, Line 36, delete "F2[x]." and insert --$F_2[x]$.-- therefor In Column 7, Line 37, delete "F2" and insert --$F_2$-- therefor Signed and Sealed this  
Twelfth Day of January, 2021

Andrei Iancu  
*Director of the United States Patent and Trademark Office*

CERTIFICATE OF CORRECTION (continued)
U.S. Pat. No. 10,333,698 B2

In Column 8, Line 65, delete "x" and insert --$\pi$-- therefor

In Column 8, Line 65, after "{0, 1, . . . , n-1}", insert --.--

In Column 9, Line 63, delete "$\sigma(j)=\pi(+1)$" and insert --$\sigma(j)=\pi(j+1)$-- therefor In Column 10, Line 22, delete "II" and insert --III-- therefor In Column 10, Line 54, delete "k" and insert --$k_j$-- therefor In Column 11, Line 66, delete "a" and insert --$\sigma$-- therefor In Column 12, Line 31, delete "$x^5+x^{4+}x^3+x=\Rightarrow 0x3a.$" and insert --$x^5+x^{4+}x^3+x\Rightarrow 0x3a.$-- therefor In Column 13, Line 26, delete "$\{R\}+(2+3(2+5(1+11(4)))=$," and insert --$\{R\}=(2+3(2+5(1+11(4))))=$-- therefor In Column 14, Line 6, delete "0X6" and insert --0x6-- therefor In Column 15, Line 23, delete "Arithemetic" and insert --Arithmetic-- therefor In Column 17, Line 42, delete "73}(note" and insert --73} (note-- therefor In Column 17, Line 42, delete "$C_1$=96," and insert --$C_1$=96;-- therefor In Column 18, Line 29, delete "poly" and insert --polynomial-- therefor In Column 18, Line 30, delete "poly" and insert --polynomial-- therefor In Column 18, Line 48, delete "800" and insert --600-- therefor In Column 18, Line 49, delete "902" and insert --602-- therefor In Column 20, Line 31, delete "correctd," and insert --corrected,-- therefor In Column 20, Line 33, delete "correctd," and insert --corrected,-- therefor In Column 21, Line 14, delete "correctd," and insert --corrected,-- therefor In Column 21, Line 16, delete "correctd," and insert --corrected,-- therefor In Column 21, Line 61, after "synced", insert --.--

In Column 22, Line 28, delete "correctd," and insert --corrected,-- therefor

CERTIFICATE OF CORRECTION (continued)
U.S. Pat. No. 10,333,698 B2

In Column 22, Line 30, delete "correctd," and insert --corrected,-- therefor

In Column 23, Line 18, delete "correctd," and insert --corrected,-- therefor

In Column 23, Line 20, delete "correctd," and insert --corrected,-- therefor

In Column 23, Line 66, delete "correctd," and insert --corrected,-- therefor

In Column 24, Line 1, delete "correctd," and insert --corrected,-- therefor

In Column 24, Line 50, delete "R1" and insert --$R_1$-- therefor

In Column 26, Line 5, delete "GI, BI" and insert --$G_I$, $B_I$-- therefor

In Column 26, Line 8, delete "$R'=G \cap B \emptyset =G \cup B$" and insert --$R'=G \cup B \emptyset =G \cap B$-- therefor In Column 26, Line 10, delete "$R'=G_I \cap B_I \emptyset =G_I \cup B_I$" and insert --$R'=G_I \cup B_I \emptyset =G_I \cap B_I$-- therefor In Column 26, Line 12, delete "GI, BI" and insert --$G_I$, $B_I$-- therefor In the Claims In Column 27, Line 32, in Claim 7, delete "correctd," and insert --corrected,-- therefor In Column 27, Line 34, in Claim 7, delete "correctd," and insert --corrected,-- therefor In Column 28, Line 19, in Claim 14, delete "correctd," and insert --corrected,-- therefor In Column 28, Line 22, in Claim 14, delete "correctd," and insert --corrected,-- therefor